United States Patent
Bookman et al.

(10) Patent No.: US 9,531,639 B2
(45) Date of Patent: Dec. 27, 2016

(54) SYSTEMS AND METHODS FOR ALLOCATING ONLINE RESOURCES

(71) Applicants: Peter G. Bookman, Huntsville, UT (US); Anant Daksh Asthana, Cottonwood Heights, UT (US)

(72) Inventors: Peter G. Bookman, Huntsville, UT (US); Anant Daksh Asthana, Cottonwood Heights, UT (US)

(73) Assignee: SPHERE 3D INC., Mississauga, Ontario (CA)

( * ) Notice: Subject to any disclaimer, the term of this patent is extended or adjusted under 35 U.S.C. 154(b) by 0 days.

(21) Appl. No.: 15/052,339

(22) Filed: Feb. 24, 2016

(65) Prior Publication Data

US 2016/0308783 A1    Oct. 20, 2016

Related U.S. Application Data

(60) Provisional application No. 62/149,886, filed on Apr. 20, 2015.

(51) Int. Cl.
| | | |
|---|---|---|
| *G06F 15/173* | (2006.01) | |
| *H04L 12/911* | (2013.01) | |
| *G06F 9/50* | (2006.01) | |
| *G06F 9/455* | (2006.01) | |

(52) U.S. Cl.
CPC ......... *H04L 47/822* (2013.01); *G06F 9/45558* (2013.01); *G06F 9/5077* (2013.01); *H04L 47/823* (2013.01); *G06F 2009/4557* (2013.01); *G06F 2009/45595* (2013.01)

(58) Field of Classification Search
CPC .................................. G06F 9/50; G06F 9/455
USPC ..... 709/223, 224, 225, 226, 229; 718/1, 104
See application file for complete search history.

(56) References Cited

U.S. PATENT DOCUMENTS

| 8,635,318 | B1 * | 1/2014 | Shankar | ................ | H04L 41/085 709/205 |
| 2006/0075199 | A1 * | 4/2006 | Kallahalla | ............. | G06F 3/0608 711/153 |

OTHER PUBLICATIONS

"Dynamic Resource Allocation for Database Servers Running on Virtual Storage"—Soundararajan et al, University of Toronto, Jun. 2010 http://www1.ece.neu.edu/~ningfang/SimPaper/soundararajan.pdf.*

* cited by examiner

*Primary Examiner* — Randy Scott

(57) ABSTRACT

Various embodiments are described herein for methods and systems for managing online resource allocation between a plurality of virtual computers. A plurality of resources can be provided via a host server. The host server can define a plurality of resource pools, where each resource pool defines an associated group of resources. Each virtual computer can be assigned to an associated resource pool. The host server can then automatically provide access for each virtual computer to the group of resources corresponds to the resource pool to which they were assigned. The host server can then determine a pool usage profile by monitoring the usage of the resources in the resource pools and store the pool usage profile. The pool usage profile may be used to re-define the resource pools or re-assign virtual computers.

19 Claims, 12 Drawing Sheets

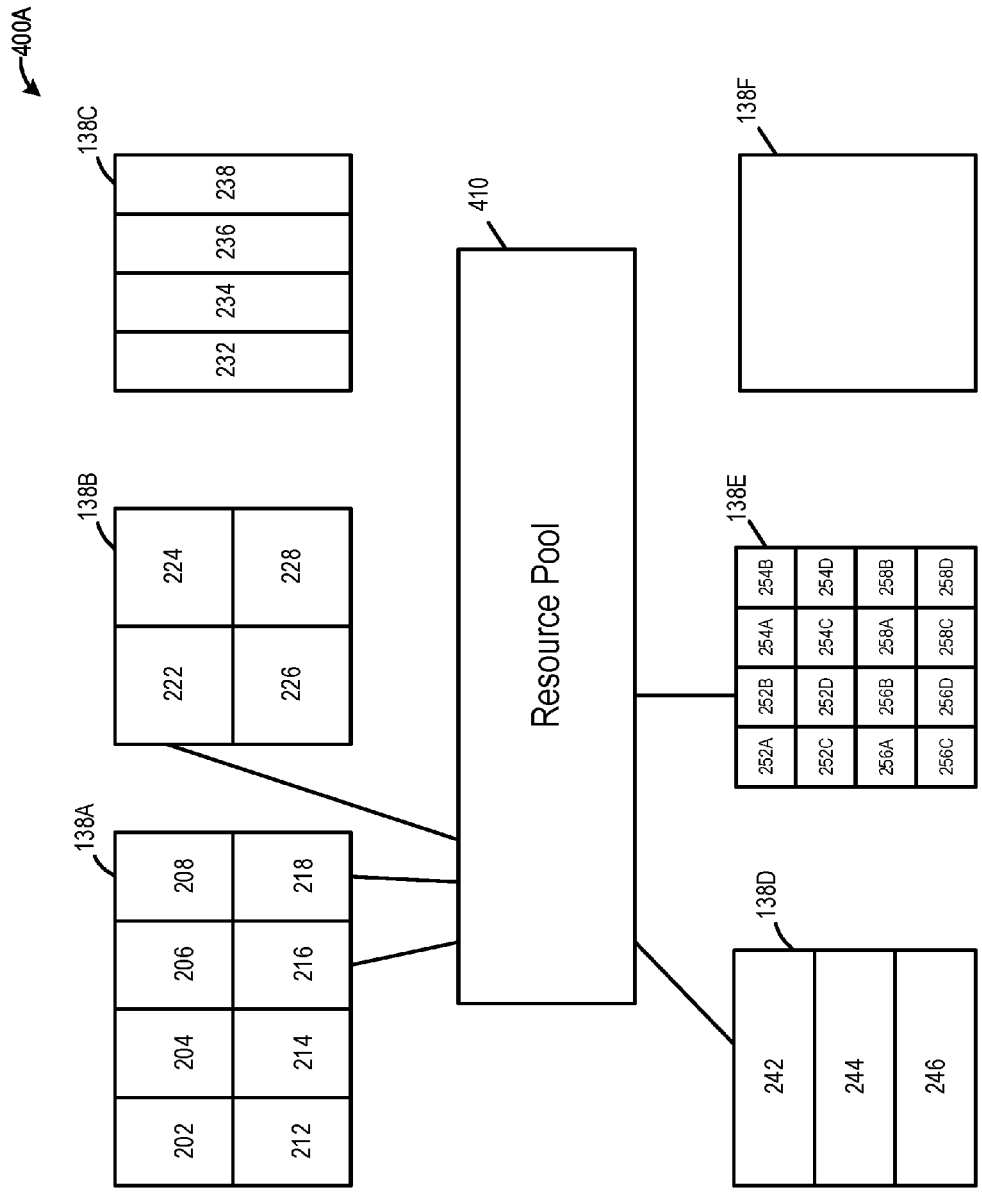

SYSTEMS AND METHODS FOR ALLOCATING ONLINE RESOURCES

RELATED APPLICATIONS

This application claims priority from the U.S. patent application No. 62/149,886, filed Apr. 20, 2015 entitled "SYSTEMS AND METHODS FOR ALLOCATING ONLINE RESOURCES", the disclosure of which is incorporated herein, in its entirety, by reference.

FIELD

Various embodiments are described herein that generally relate to methods and systems for managing the allocation of online resources between a plurality of virtual computers.

BACKGROUND

Virtual computers can be used to provide a range of computational functionality to a user by operating a range of remote hardware and software resources from a user device. A user may install a local application that interfaces with a host server providing the virtual computer. The user can then operate the resources of that virtual computer without needing to have the necessary hardware or to install all the software applications being used.

Virtual computers generally rely on a combination of several resources to provide defined functionality. Resources can include hardware resources, such as graphics processing units, and software resources, such as software applications. Resources can be expensive to procure and can be expensive to continually operate. Virtual computers often do not utilize assigned resources for continuous durations of time or do not fully utilize the assigned resources. Consequently, allocated resources for providing a virtual computer can operate in an idle state or in an underutilized state for extended periods of time.

SUMMARY

Various embodiments are described herein that generally relate to methods and systems for allocating resources between a plurality of virtual computers.

In a broad aspect, at least one embodiment described herein provides a method of managing online resource allocation between a plurality of virtual computers. The method can include providing a plurality of resources via a host server, the plurality of resources being accessible to the plurality of virtual computers. Each virtual computer in the plurality of virtual computers can be linked to electronically communicate with the host server. The method can also include defining a plurality of resource pools for the host server, where each resource pool in the plurality of resource pools defines an associated group of resources selected from the plurality of resources and excludes other resources in the plurality of resources, and assigning each virtual computer in the plurality of virtual computers to an associated resource pool in the plurality of resource pools. Then, for each virtual computer in the plurality of virtual computers, automatically providing, by the host server, that virtual computer with access to the associated group of resources corresponding to the associated resource pool to which that virtual computer was assigned and excluding access to all other resources in the plurality of resources to that virtual computer. The method can also include for each resource pool: determining, by the host server, a pool usage profile by monitoring the usage, by the virtual computers assigned to that resource pool, of the resources in the associated group of resources corresponding to that resource pool and storing the determined pool usage profile in a storage module accessible by the host server.

In some embodiments, the described methods may further include defining a plurality of resource kinds for providing a plurality of different functions, each resource kind in the plurality of resource kinds providing an associated function in the plurality of different functions. Each resource in the plurality of resources may correspond to a resource kind within the plurality of resource kinds and provide the associated function for that resource kind. The associated group of resources for each resource pool can be defined to correspond to an associated group of resource kinds selected from the plurality of resource kinds and the associated group of resource kinds for each resource pool can be different from an associated groups of resource kinds defined by at least one other resource pool in the plurality of resource pools.

In some embodiments, the pool usage profile for each resource pool can be determined by determining, by the host server, for each resource kind in the associated group of resource kinds a capacity of that resource kind and monitoring a usage level of each resource kind. In some embodiments, for each resource pool, the described methods can further include determining, for each resource kind in the associated group of resource, a usage variability by monitoring change in the usage level of that resource kind.

In some embodiments, the described methods can include defining, for each resource kind in the plurality of resource kinds, at least one resource type, where each resource type corresponds to a particular resource kind and provides a different function level of the associated function provided by that resource kind. Each resource in the plurality of resources can correspond to a resource type. The associated group of resources for each resource pool can be defined as an associated group of resource types, where the associated group of resources types for a particular resource pool can be defined by selecting, for each resource kind in the associated group of resource kinds defined for that pool, at least one of the resource types defined for that particular resource kind and excluding at least one of the resource types defined for that particular resource kind.

In some embodiments, for at least two resource pools in the plurality of resource pools, the at least two resource pools including a first resource pool and a second resource pool, and for at least two resources of a same type, the at least two resources including a first resource and a second resource, the first resource is in the associated group of resources defined by the first resource pool and the second resource is in the associated group of resources defined by the second resource pool.

In some embodiments, for a first resource pool in the plurality of resource pools, at least two resources of a same type are in the associated group of resources defined by the first resource pool.

In some embodiments, for a first resource pool, the associated group of resources types for the first resource pool can include, for at least one particular resource kind in the associated group of resource kinds defined by the first resource pool, a plurality of the resource types defined for each of those particular resource kinds and exclude at least one of the resource types defined for each of those particular resource kinds.

In some embodiments, for a first resource kind in the associated group of resource kinds defined by a first resource pool, the associated group of resources types can include at most one of the resource types defined for the first resource kind.

In some embodiments, the described methods can include selecting, by the host server, a selected virtual computer in the plurality of virtual computers, the selected virtual computer being presently assigned to a first resource pool in the plurality of resource pools, the first resource pool defining a first associated group of resources. The methods can also include identifying a second resource pool in the plurality of resource pools, the second resource pool defining a second associated group of resources different from the first associated group of resources. The method can include reassigning the selected virtual computer to the second resource pool, and then automatically providing, by the host server, the selected virtual computer with access to the second associated group of resources and excluding access to the first associated group of resources.

In some embodiments, the selected virtual computer can be selected by receiving, at the host server, a request for modifying the resources to which the selected virtual computer has access.

In some embodiments, the second resource pool can be identified by identifying resource functionality requirements of the selected virtual computer and identifying the second resource pool as a resource pool having an associated group of resources sufficient for the identified resource functionality requirements.

In some embodiments, the described methods can include defining a plurality of resource discrepancy conditions. The plurality of resource discrepancy conditions can include an overcapacity condition where the usage level of at least one resource kind is less than the capacity of that resource kind by an overcapacity threshold, an undercapacity condition where a requested usage of at least one resource kind is greater than an undercapacity threshold of that resource kind, the undercapacity threshold for each resource kind being determined based on the capacity and the usage variability of that resource kind, and a fluctuation condition where the usage variability of at least one resource kind is greater than a variability threshold. The methods can also include identifying a first resource pool having an associated pool usage profile indicating one of the resource discrepancy conditions, and at least one of modifying the associated group of resources to which at least one virtual computer assigned to the first resource pool is provided access, and modifying the assignment of virtual computers for that first resource pool.

In some embodiments, the associated group of resources to which at least one virtual computer assigned to the first resource pool is provided access can be modified by re-assigning the at least one virtual computer to a second resource pool, and automatically providing, by the host server, the at least one virtual computer with access to the group of resources associated with the second resource pool and excluding access to the group of resources associated with the first resource pool.

In some embodiments, the associated group of resources to which at least one virtual computer assigned to the first resource pool is provided access can be modified by modifying the associated group of resources to which every virtual computer assigned to the first resource pool is provided access.

In some embodiments, the described methods can include re-assigning every virtual computer from the first resource pool to a second resource pool, and automatically providing, by the host server, for every virtual computer being re-assigned, access to the group of resources associated with the second resource pool and excluding access to the group of resources associated with the first resource pool.

In some embodiments, the described methods can include redefining the associated group of resources of the first resource pool to account for the resource discrepancy.

In some embodiments, the described methods can include identifying recurring changes in the associated pool usage profile of the first resource pool associated corresponding to the resource discrepancy condition, and then redefining the associated group of resources of the first resource pool such that the redefined associated group of resources prevents the occurrence of the resource discrepancy condition associated with the recurring changes in the associated pool usage profile.

In some embodiments, when the recurring changes are periodic, the described methods can include identifying a period of the recurring changes to the associated pool usage profile, and then continually redefining the associated group of resources of the first resource pool prior to the changes occurring using the identified period.

In some embodiments, the described methods can include determining a plurality of resource usage profiles by determining, for each virtual computer in the plurality of virtual computers, an associated resource usage profile. The associated resource usage profile can indicate, for each function in a group of functions associated with that virtual computer, a level of function required for that virtual computer. The methods can also include defining the associated group of resources for each resource pool in the plurality of resource pools such that each virtual computer is allocatable to at least one of the resource pools with the at least one of the resource pools having an associated group of resources sufficient for the resource usage profile for that virtual computer.

In some embodiments, the described methods can include monitoring ongoing resource usage for each virtual computer in the plurality of virtual computers, and then based on the monitoring, identifying at least one virtual computer in the plurality of virtual computers having an associated resource usage profile that has significantly changed. The at least one virtual computer may be presently assigned to a first resource pool in the plurality of resource pools, and the associated resource usage profile may better correspond to a second resource pool in the plurality of resource pools. The methods may then include transferring the at least one virtual computer from the first resource pool to the second resource pool, and automatically providing the at least one virtual computer with access to the associated group of resources of the second resource pool.

In some embodiments, the described methods can include for a first resource pool, assigning at least two virtual computers having different resource usage profiles to the first resource pool, the first resource pool defining an associated group of resources sufficient for the resource usage profiles of the at least two virtual computers to be satisfied concurrently.

In some embodiments, the described methods can include defining a plurality of virtual computer clusters, each virtual computer cluster including at least two virtual computers from the plurality of virtual computers and each virtual computer cluster having a cluster usage profile range determined based on the resource usage profiles for every virtual computer in that virtual computer cluster. The methods can further include assigning each virtual computer in the plurality of virtual computers to an associated resource pool by, for each virtual computer cluster, assigning each virtual computer in that virtual computer cluster to the resource pool having an associated group of resources sufficient to meet the cluster usage profile range.

In some embodiments, for at least two virtual computers in a same virtual computer cluster, a first virtual computer of that same virtual computer cluster can be assigned to a first resource pool and a second virtual computer of that same virtual computer cluster can be assigned to a second resource pool.

In some embodiments, the described methods can include monitoring ongoing resource usage for each virtual computer cluster in the plurality of virtual computer clusters, and then based on the monitoring, identifying a virtual computer cluster in the plurality of virtual computer clusters having an associated cluster usage profile range that has significantly changed. Then the methods may also include, for at least some of the virtual computers in the identified virtual computer cluster, modifying the associated group of resources to which those virtual computers are provided access.

In some embodiments, based on the monitoring, the plurality of virtual computer clusters can be redefined such that at least one of the virtual computers in the identified virtual computer cluster is associated with a different virtual computer clusters after the plurality of virtual computer clusters are redefined.

In accordance with some embodiments, there is provided a system for managing online resource allocation between a plurality of virtual computers. The system can include a storage module, and a host server linked to electronically communicate with the plurality of virtual computers and the storage module. The host server can be configured to control access to a plurality of resources accessible to the plurality of virtual computers by: defining a plurality of resource pools, where each resource pool in the plurality of resource pools defines an associated group of resources selected from the plurality of resources and excludes other resources in the plurality of resources, assigning each virtual computer in the plurality of virtual computers to an associated resource pool in the plurality of resource pools, and then for each virtual computer in the plurality of virtual computers, automatically providing that virtual computer with access to the associated group of resources corresponding to the associated resource pool to which that virtual computer was assigned and excluding access to all other resources in the plurality of resources to that virtual computer. For each resource pool, the host server can further be configured to determine a pool usage profile by monitoring the usage, by the virtual computers assigned to that resource pool, of the resources in the associated group of resources corresponding to that resource pool and store the determined pool usage profile in the at least one storage module. The system can also include at least one remote processing device, with each remote processing device being configurable to access at least one of the virtual computers to operate the associated group of resources corresponding to the associated resource pool to which that virtual computer was assigned.

BRIEF DESCRIPTION OF DRAWINGS

Several embodiments will now be described in detail with reference to the drawings, in which:

FIG. 4A is a block diagram illustrating a resource pool corresponding to an associated group of resources in accordance with an example embodiment;

Figure 1:
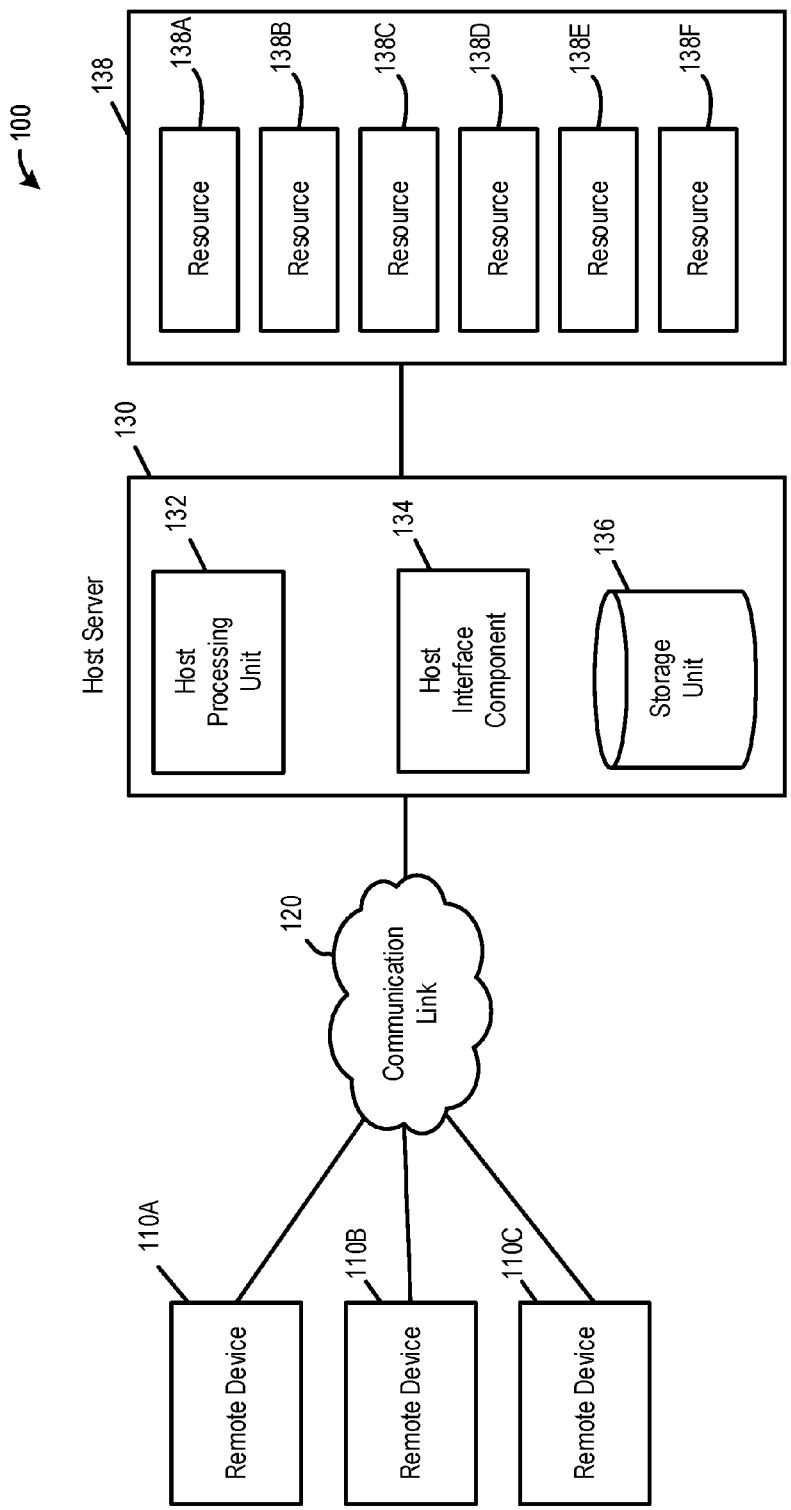
FIG. 1 is a block diagram illustrating a system for managing online resource allocation between a plurality of virtual computers in accordance with an example embodiment.

The drawings, described below, are provided for purposes of illustration, and not of limitation, of the aspects and features of various examples of embodiments described herein. The drawings are not intended to limit the scope of the teachings in any way. For simplicity and clarity of illustration, elements shown in the figures have not necessarily been drawn to scale. The dimensions of some of the elements may be exaggerated relative to other elements for clarity. It will be appreciated that for simplicity and clarity of illustration, where considered appropriate, reference numerals may be repeated among the figures to indicate corresponding or analogous elements or steps.

DESCRIPTION OF EXAMPLE EMBODIMENTS

The various embodiments described herein generally relate to systems and methods for managing online resource allocation between a plurality of virtual computers. A user may interact with a remote processing device to access a virtual computer or virtual desktop provided by a host server. The host server may provide access to a plurality of virtual computers, and may enable multiple users to operate virtual computers simultaneously. In some cases, the host server may be implemented using a plurality of host servers electronically linked to one another over a local area network or a wide area network such as the Internet.

The host server may also be electronically linked to a plurality of resources. The plurality of resources can be accessible to the plurality of virtual computers. The resources may include different resource kinds for providing a plurality of different functions. The resource kinds can include real or virtual hardware resource kinds such central processing units (CPU), graphics processing units (GPU), memory storage units, such as hard drives or flash memory devices, or random access memory (RAM). The resource kinds may also include software resource kinds such as word processing programs (e.g. Microsoft Word™), speech recognition software or image editing programs (e.g. Adobe Photoshop) for example. Each resource can be associated with a resource kind. The term resource kind is generally used herein to refer to a category of resources that are alike in providing a particular function, albeit at possibly different levels of functionality as described below.

In some cases, the plurality of resources may also include different resource types for various resource kinds. Each resource kind in the plurality of resource kinds may have at least one resource type corresponding to that resource kind. The term resource type is generally used herein to refer to a particular function level of the associated function provided by the resource kind associated with a particular resource type.

For example, the plurality of resources accessible by the virtual computers may include different types of GPU resources such as 2D acceleration graphics processors and 3D acceleration graphics processors and/or different types (i.e. versions) of software resources such as different versions of Microsoft Word. These GPUs on the one hand, or versions of Microsoft Word on the other hand, are resources of the same kind as they provide related functionalities: graphics processing in the case of GPUs and word processing in the case of the different versions of Microsoft Word. However, resources of the same kind may be a different type in that they differ somewhat in the functionality provided, in that the different GPUs provide 2D versus 3D acceleration graphics processing, while the different versions of Microsoft Word provide different levels or different variants at least of word processing functionality.

In some cases, the host server may provide access to multiple tokens of a particular resource kind or resource type. A token refers to a specific resource that corresponds to the particular resource kind and/or particular resource type. For example, the host server may control access to five 3D acceleration GPUs, and each of those 3D acceleration GPUs may be referred to as a token of a GPU resource kind and 3D acceleration resource type.

The host server may control access to the plurality of resources to allocate resources between the different virtual computers. The various systems and methods described herein may be applied to minimize overcapacity of resources (i.e. minimize the underutilization of specific resources) while also providing the users of virtual computers with access to the resources necessary for different activities they need to perform. The various systems and methods described herein may also enable users to access specific high end resource kinds and/or resource types more efficiently and at lower costs. For instance, this may occur where users choose to operate virtual computers with access to lower end (i.e. less expensive or more readily available) resources for a majority of the time but require virtual computers with access to high end resources kinds and/or resource types infrequently or periodically.

For example, a marketing professional may typically operate a virtual computer having sufficient resources for email, standard web browsing, and standard content creation using software resources such as those provided in Microsoft Office. Occasionally, the marketing professional may need to create or edit visual content such as videos. In such cases, the marketing professional may want the virtual computer they are operating to have access to higher end resource kinds and/or types to facilitate the desired functionality. The host server may provide the virtual computer being operated by that user with access to the desired higher end resources for a scheduled amount of time (or as required), and once the scheduled time has ended or the higher end resources are no longer required, the virtual computer may be provided access only to the lower end resources and excluded from accessing the higher end resources.

In the systems and methods described herein, the host server may manage the allocation of online resources by defining a plurality of resources pools. Each resource pool in the plurality of resource pools may define an associated group of resources selected from the plurality of resources and exclude other resources from the plurality of resources. The host server may then assign each virtual computer in the plurality of virtual computers to an associated resource pool in the plurality of resources pools. For each virtual computer in the plurality of virtual computers, the host server may then provide that virtual computer with access to the associated group of resources corresponding to the associated resource pool to which that virtual computer was assigned and exclude access to all other resources in the plurality of resources to that virtual computer.

In the example given above, the host server may define a resource pool for users such as the marketing user. The resource pool could include 2 standard virtual CPUs, 4 GB of virtual RAM, software resources required for standard web browsing and standard content creation, and no GPU resources. The host server may then assign the virtual computer operated by a lower end marketing user to the resource pool. The virtual computer being operated by the user would then be providing access automatically to the resources of the first resource pool.

The host server may also determine a pool usage profile for each resource pool. The pool usage profile may be determined by monitoring the usage of the resources in the associated group of resources for each resource pool. The determined pool usage profile can be stored in a storage module accessible by the host server.

By monitoring and modeling resource usage by virtual computers, the systems and methods described herein may define (and possibly re-define) resource pools to minimize overcapacity (the extent to which capacity of resources exceeds actual usage) and to ensure that actual usage does not exceed resource capacity. Similarly, the assignment of virtual computers to a resource pool may be optimized to minimize overcapacity and minimize variability in usage. In some cases, the group of resources for one or more resource pools may be modified or redefined by the host server based on the monitoring. One or more virtual computers may also be re-assigned as a result of the monitoring.

For example, the host server may select a virtual computer that is presently assigned to a first resource pool that defines a first associated group of resources. The host server may identify a second resource pool that defines a second associated group of resources different from the first associated group of resources. For instance, in the marketing example discussed above, the second associated group of resources may include 4 virtual CPUs, 8 GB of virtual RAM, software resources required for video content creation and editing, and 1 GPU.

The host server may reassign the selected virtual computer to the second resource pool and then automatically provide the selected virtual computer with access to the second associated group of resources and exclude access to the first associated group of resources.

Re-assignment of a virtual computer may be initiated in a number of ways. In some cases, the host server may receive a request for an upgraded virtual computer from a remote processing device being operated by a user. In some cases, the host server may determine (e.g. by monitoring the resource usage of that particular virtual computer) that different resource functionality is required, or is about to be required. Various other different ways in which a virtual computer may be selected to be re-assigned are described below.

In some cases, the resource usage of the plurality of virtual computers can be analyzed to identify virtual computer clusters. Virtual computer clusters generally refer to a group of at least two virtual computers having similar resource usage profiles. That is, a cluster can be defined to include a plurality of virtual computers where each virtual computer has a resource usage profile that falls within a cluster usage profile range. Generally, clusters indicate groups of virtual computers operated by users requesting similar resource functionality.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Reference is first made to FIG. 1, which shows a block diagram of an example system 100 for managing online resource allocation between a plurality of virtual computers. System 100 includes a plurality of remote devices 110, a host server 130, and a plurality of resources 138. The host server 130 may communicate with one or more remote devices 110, such as remote devices 110A, 1106 and 110C, using communication link 120.

It will be understood that although three remote devices 110A, 1106 and 110C are illustrated in FIG. 1, fewer or greater number of remote devices 110 may communicate with the host server 130 via the communication link 120. Similarly, although only one host server 130 is shown in FIG. 1 for ease of exposition, it will be understood that host server 130 can include a plurality of servers that may be distributed over a wide geographic area and be in electronic communication with each other, and with the other components shown in FIG. 1, via the communication link 120.

The remote device 110 may be any networked computing device operable to connect with the communication link 120 through a wired or wireless connection. The remote devices 110 may include at least a processor and memory (not shown), and may be an remote processing device such as an electronic tablet device, a personal computer, workstation, server, portable computer, mobile device, personal digital assistant, laptop, smart phone, WAP phone, an interactive television, video display terminals, gaming consoles, portable electronic devices and the like. In some embodiments, the remote devices 110 may be a laptop or a smart phone device equipped with a network adapter for connecting to the Internet through the communication link 120. Each remote device 110 may be configured to access at least one virtual computer to operate an associated group of resources corresponding to the associated resource pool to which that virtual computer is assigned.

The communication link 120 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between host server 130, remote devices 110, and resources 138.

As shown in FIG. 1, the host server 130 may include one or more components, such as a host processing unit 132, a host interface component 134, and a storage unit 136. While resources 138 such as resources 138A, 138B, 138C, 138D, 138E and 138F are shown separate from the host server 130, in some embodiments the resources 138 may be provided directly by the host server 130. Similarly, the resources 138 may be provided by a plurality of servers that can be distributed over a wide geographic area and are in electronic communication with the host server 130.

The host processing unit 132, the host interface component 134, the storage unit 136 and the one or more resources 138 may be combined into a fewer number of components or may be separated into further components. The host processing unit 132, the host interface component 134, the storage unit 136 and the one or more resources 138 may be implemented in software or hardware, or a combination of software and hardware.

Generally, the host processing unit 132 can be configured to control the operation of the host server 130. For example, the host processing unit 132 may initiate and manage the operations of each of the other components at the host server 130. The host processing unit 132 may also control access to the resources 138 that is provided to the various virtual computers being accessed by the remote devices 108.

The host processing unit 132 may be any suitable processor(s), controller(s) and/or digital signal processor(s) that may provide sufficient processing power depending on the configuration, purpose and requirements of the host resource server 130. In some embodiments, the host processing unit 132 may include more than one processor with each processor being configured to perform different dedicated tasks.

The host interface component 134 may be any interface that enables the host server 130 to communicate with other devices and systems. In some embodiments, the host interface component 134 may include at least one of a serial port, a parallel port or a USB port. The host interface component 134 may also include at least one of an Internet, Local Area Network (LAN), Ethernet, Firewire™, modem or digital subscriber line connection. The host interface component 134 can include both wired and wireless connections. Various combinations of these elements may be incorporated within the host interface component 134.

The storage unit 136 may include suitable data storage elements, such as one or more databases. In some embodiments, the storage unit 136 may store a resource pool library that includes definitions of a plurality of resource pools. The host processing unit 132 may define the plurality of resource pools stored in storage unit 136. The storage unit 136 may also store the access rights for each of the virtual computers in the plurality of virtual computers. The host processing unit 132 may assign each virtual computer to one of the resource pools and store an indication of the assignments in the storage unit 136. The host processing unit 132 can then adjust the resources to which each virtual computer has access based on the resource pools and the assignment of virtual computers stored in the storage unit 136.

In some cases, the host processing unit 132 may monitor the usage of resources for each of the resource pools to determine a pool usage profile. The pool usage profile can determined by monitoring the usage, by each virtual computer assigned to a resource pool, of the resources in the associated group of resources corresponding to that resource pool. Similarly, the host processing unit 132 may monitor the usage of resources by each virtual computer to generate a resource usage profile. Generally, the resource usage profile for a virtual computer can indicate, for each function in a group of functions associated with or typically required by a virtual computer, a level of functionality required for that virtual computer. In any case, the pool usage profile and/or the resource usage profile can be stored in the storage unit 136.

The one or more resources 138, such as resources 138A, 138B, 138C, 138D, 138E, 138F, may include a plurality of different resource kinds and a plurality of different resource types, such as hardware resources and/or software resources. For example, hardware resources may include central processing units (CPU), graphics processing units (GPU), memory storage units, such as hard drives or flash memory devices, or random access memory (RAM). Software resources may include software applications such as Microsoft Word™, speech recognition software or game applications for example.

The host processing unit 132 may define each resource pool to include an associated group of resources selected from the resources 138 and exclude other resources from the resources 138. Examples of resources 138 and resource pools will be described in greater detail with reference to FIGS. 3A to 4C.

Figure 2:
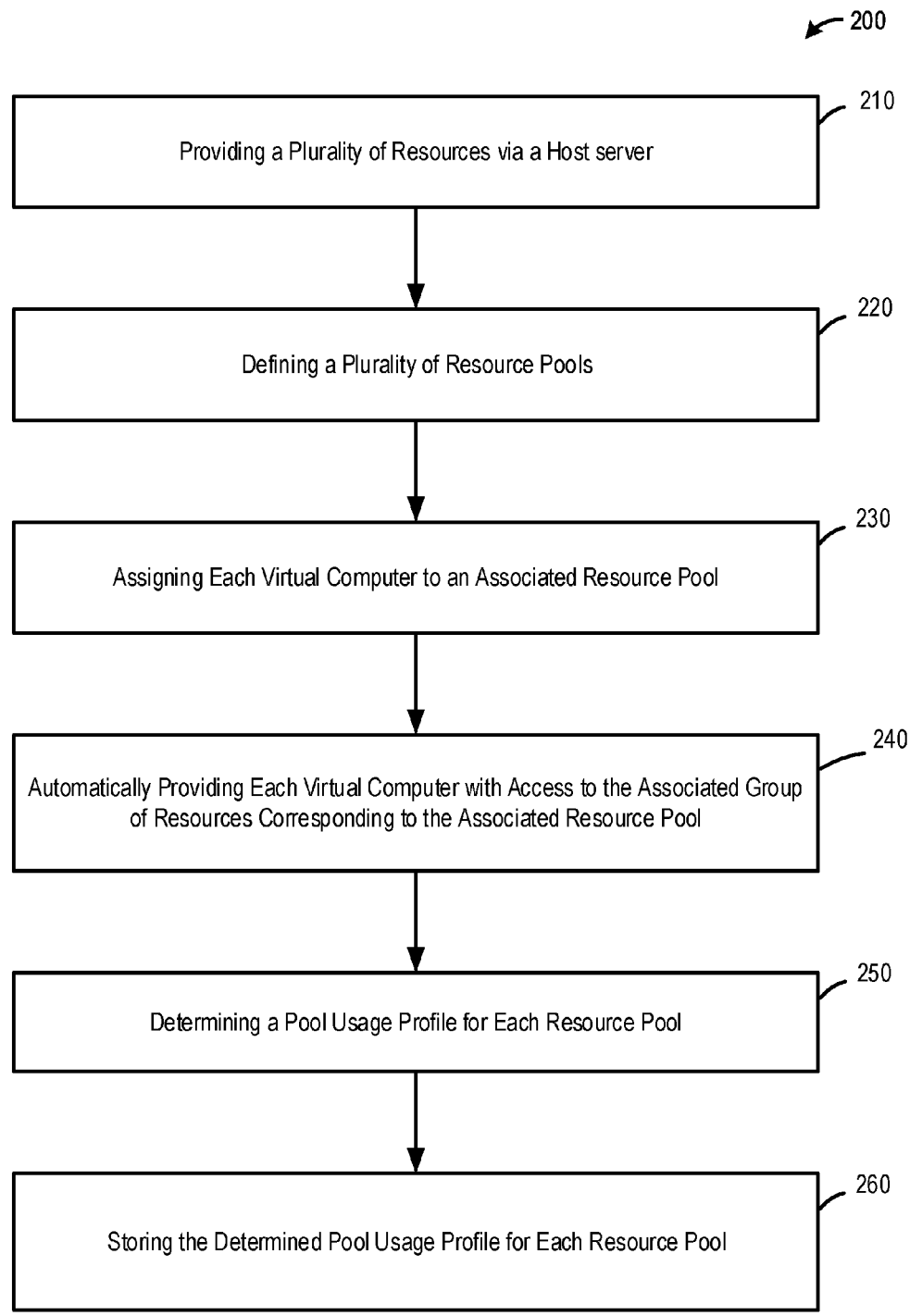
FIG. 2 is flowchart of a method of managing resource allocation between a plurality of virtual computers in accordance with an example embodiment.

Referring now to FIG. 2, shown therein is a flowchart of an example embodiment of a method 200 of managing resource allocation between a plurality of virtual computers.

At 210, a plurality of resources are provided via a host server. The plurality of resources can be accessible to a plurality of virtual computers, with each virtual computer in the plurality of virtual computers linked to electronically communicate with the host server.

In some embodiments, the plurality of resources 138 may be provided at the host server 130. In other embodiments, one or more resources 138 may not be at the host server 130. However, although one or more resources 138 may not be at the host server 130, the host server 130 may be electronically linked to the one or more resources 138 that are not present at host server 130. The host server 130 may also control access to the resources 138 that is provided to the various virtual computers and may exclude some resources from being accessed by particular virtual computers.

The host server 130 may also define plurality of resource kinds for providing a plurality of different functions. Each resource kind in the plurality of resource kinds can provide an associated function in the plurality of different functions. Each resource in the plurality of resources may correspond to a resource kind within the plurality of resources kinds and provide the associated function for that resource kind.

For example, resource 138A may be a CPU resource kind and may provide general processing or computational functions. Resource 138B may be a GPU resource kind and may provide graphics processing functions. Resource 138C may be a sound processor resource kind. Resource 138D may be a software application resource kind such as Microsoft Word™ or Microsoft Windows™. Resource 138E may be a storage device resource kind such as a hard disk drive, and resource 138F may be an encryption module resource kind.

In some cases, the host server may also define, for each resource kind in the plurality of resource kinds at least one resource type. Each resource type may correspond to a particular resource kind and may provide a different function level of the associated function provided by that resource kind. Each resource in the plurality of resources may correspond to a resource type.

For example, a plurality of resources 138B of a GPU resource kind may be included in the plurality of resources 138. The GPU resources 138B may include a plurality of different types (or variants) of graphics processing units. Each type of graphics processing unit may provide a different function level of processing (e.g. have different features or different capabilities). For example, 2D acceleration graphics processors and 3D acceleration graphics processors may be two types of graphics processing unit resources. A 2D acceleration graphics processor may only be capable of rendering a display with two-dimensional images or text. A 3D acceleration graphics processor may be capable of rendering three-dimensional images or video at high frame rates.

In another example, there may be several different types (or variants) of a resource kind. Resource 138D may be a word processing software application and a plurality of different types of resource 138D may be included in the plurality of resources 138. For example, Microsoft Office™ Professional Edition, Microsoft Office™ Home Edition and Microsoft Office™ Student Edition are types of Microsoft Office™ software applications. Each type of the Microsoft Office™ software application may provide a user with different use capabilities or feature sets.

For each resource type, there may be at least one token of the resource type. In one example, resource 138E may be a resource kind, such as a hard disk drive. Further, there may be several different types of the hard disk drive, such as hard disk drives that have different data read and write access times. For example, for a hard drive type having a read speed capability of up to 500 MB/s, there may be 4 tokens of the hard drive type having a read speed of 500 MB/s.

In some embodiments, the host processing unit 132 may store each resource type of a particular resource kind in a hierarchically ordered manner in the storage unit 136. That is, the host processing unit 132 may store the resource types with associated use indicators that indicate that some types of resources as preferable for certain uses, while other types of resources are preferable for other purposes. For example, 3D acceleration graphics processors may be associated with tasks such as converting three dimensional wireframe models into two dimensional images with three dimensional photorealistic effects. 2D acceleration graphics processors may be associated with providing text or static images. These hierarchical indicators may be used by the host processing unit 132 when defining the resource pools (at 220, below) and/or assigning virtual computers to resource pools (at 230, below)

At 220, a plurality of resource pools can be defined for the host server. In some cases, the host processing unit 132 may define the plurality of resource pools. Each resource pool in the plurality of resource pools defines an associated group of resources selected from the plurality of resources and excludes other resources in the plurality of resources.

The host processing unit 132 may store a resource pool library in the storage unit 136. The resource pool library may include definitions of the associated group of resources for each resource pool. The resource pool library may also include details or pointers to where those resources are located. These pointers can then be used by the host processing unit 132 to provide access to the particular resources.

The host processing unit 132 may define a plurality of resource pool elements. Each resource pool element can be defined to correspond to one of the resource pools defined at 220. The resource pool elements can then be stored and used by the host processing unit 132 to represent the resource pool elements to monitor them, model them, and to control access to the plurality of resources 138. The resource pool element corresponding to a particular resource pool can include a pool resource identifier for each of the resources in the associated resource group defined by that particular resource pool. The resource pool element for a particular resource pool may also include access rights to each of the resources in the associated resource group defined by that particular resource pool. The resource pool element could also include a functionality spectrum representing all of the functionalities provided by the resources of that particular resource pool, and associated with that functionality spectrum, could also include a resource usage spectrum, representing the extent to which each functionality in the functionality spectrum is being used at a particular time. Historical data regarding this usage can also be stored, from ongoing monitoring. This historical data can then be used together with other data, possibly involving external events, such as software updates, changes in tax laws etc., to model the expected resource usage spectrum going forward.

Figure 3A:
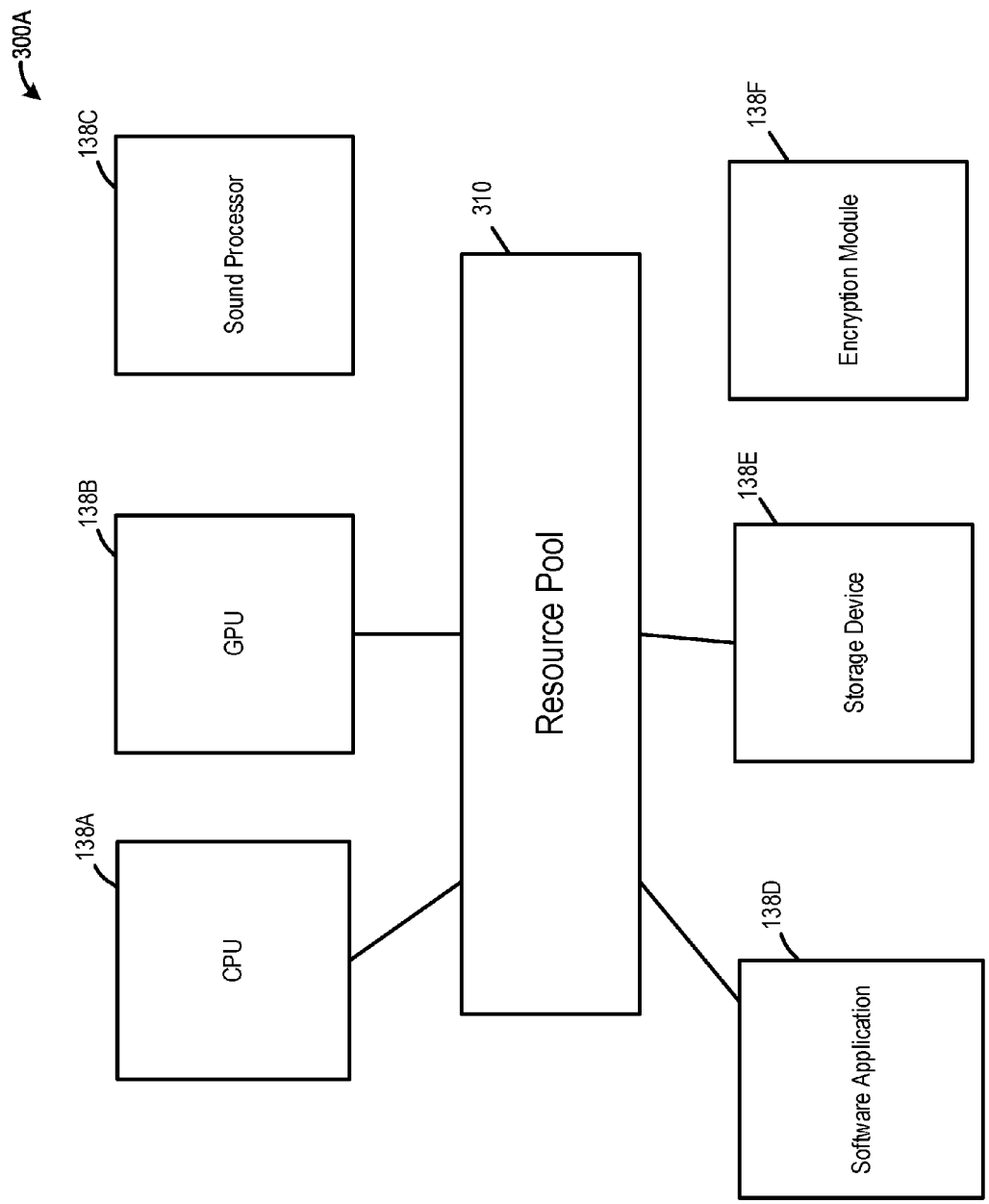
FIG. 3A is a block diagram illustrating a resource pool corresponding to an associated group of resources in accordance with an example embodiment.

Referring now to FIG. 3A, an example of a resource pool 310 is illustrated. Resource pool 310 defines an associated group of resources selected from the plurality of resources 138 and excludes other resources in the plurality of resources 138. In one embodiment, the associated group of resources for resource pool 310 corresponds to an associated group of resource kinds selected from the plurality of resource kinds. As illustrated in FIG. 3A, resource pool 310 defines an associated group of resources, such as resource 138A corresponding to a CPU resource kind, resource 138B corresponding to a GPU resource kind, resource 138D corresponding to a software application resource kind, and resource 138E corresponding to a hard disk drive resource kind. Further, resource pool 310 excludes other resources, such as resources 138C and 138F.

Figure 3B:
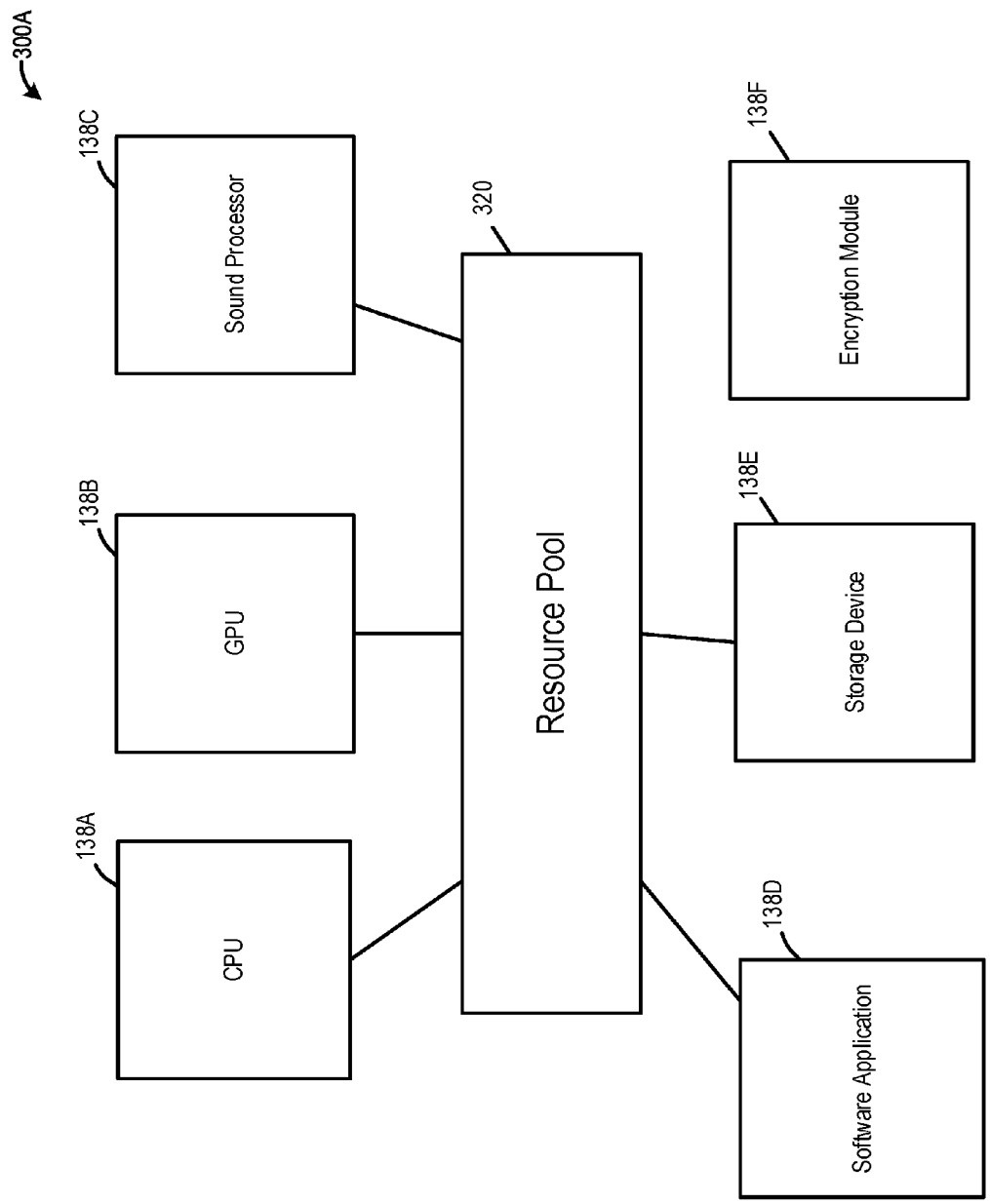
FIG. 3B is a block diagram illustrating a resource pool corresponding to an associated group of resources in accordance with another example embodiment.

Referring now to FIG. 3B, another resource pool 320 is illustrated. Resource pool 320 defines a different associated group of resources selected from the plurality of resources 138. The associated group of resources for resource pool 320 includes resource 138A corresponding to a CPU resource kind, resource 138B corresponding to a GPU resource kind, resource 138C corresponding to a sound processor resource kind, resource 138D corresponding to a software application resource kind, and resource 138E corresponding to a hard disk drive resource kind. Further, the resource pool 320 excludes other resources 138, such as resource 138F.

Although resource pool 310 and resource pool 320 as shown include resources corresponding to overlapping resource kinds, in other examples, resource pools may have resources 138 corresponding to resource kinds that are not the same. However, the associated group of resource kinds for resource pool 310 is defined to include resources that are different from the associated group of resource kinds defined for resource pool 320.

The associated group of resources for a resource pool may be defined as an associated group of resource types. The associated group of resource types for a particular resource pool can be defined by selecting, for each resource kind in the associated group of resource kinds defined for the particular resource pool, at least one of the resource types defined for that particular resource kind and excluding at least one of the resource types defined for that particular resource kind.

Referring now to FIG. 4A, shown therein is another example of a resource pool 410. Resource pool 410 may define an associated group of resources that includes at least one resource of resource kind 138A (CPU), at least one resource of resource kind 138B (GPU), at least one resource of resource 138D (software application), and at least one resource of resource 138E (hard disk drive), but excludes resources of resource kind 138C and 138F. Resource pool 410 is further defined to include particular types including a particular type of resource kind 138A (CPU), a particular type of resource kind 138B (GPU), a particular type of resource 138D (software application), and a particular type of resource 138E (hard disk drive).

As shown in FIG. 4A, CPU resource kind 138A may include a plurality of associated resource types 202-218. Resource types 202-218 may be different types of processing cores in the CPU resource kind. For example, resources types 202, 204 may correspond to CPU processing core types not capable of multi-threading while resource types 206, 208 may correspond to CPU processing cores capable of multi-threading with other CPU processing cores.

GPU resource kind 138B may include a plurality of associated resource types 222-228, sound processor resource kind 138C may include a plurality of associated resource types 232-238, software application resource kind 138D may include a plurality of associated resource types 242-246, storage device resource kind 138E may include a plurality of associated resource types 252-258, and encryption module 138F may only include a single resource type.

As shown in FIG. 4A, resource pool 410 includes CPU resource types 216 and 218. The resource types 216, 218 may, for example, be different processing core types of the CPU resource 138A. Resource pool 410 also includes GPU resource type 222 which may be a 2D graphics acceleration processor for example. Further, resource pool 410 may include software resource type 242. In addition, resource pool 410 may correspond to a resource 138E and, more specifically, may correspond to a resource kind such as a hard drive, where the resource kind corresponds to a resource type 252A. The resource type 252A may, in an example, be a hard disk drive type capable of read speeds of 500 MB/s. Accordingly, the resource pool 410 may be defined by selecting, for each resource kind in the associated group of resource kinds defined for that pool, at least one of the resource types defined for that particular resource kind (e.g. resource kind such as a GPU with a resource type 222) and excluding at least one of the resource types defined for that particular resource kind (e.g. resource kind such as a GPU, where the resource pool 410 excludes resource types 214, 216, 218).

As mentioned above, the plurality of resources may include multiple tokens of a particular resource type. As shown in FIG. 4, storage device types 252A to 252D may represent a hard drive type having read speed capabilities of up to 100 MB/s. Storage device types 254A to 254D may represent a hard drive type having read speed capabilities of up to 200 MB/s. Storage device types 256A to 256D may, for example, represent a hard drive type having read speed capabilities of up to 300 MB/s. Storage device types 258A to 258D may represent a hard drive type having read speed capabilities of up to 500 MB/s.

In some embodiments, for at least two resource pools in a plurality of resource pools, the at least two resource pools comprising a first resource pool and a second resource pool, and for at least two resources of a same type, a first resource of that same type is in the associated group of resources defined by the first resource pool and a second resource of that same type is in the associated group of resources defined by the second resource pool.

Figure 4B:
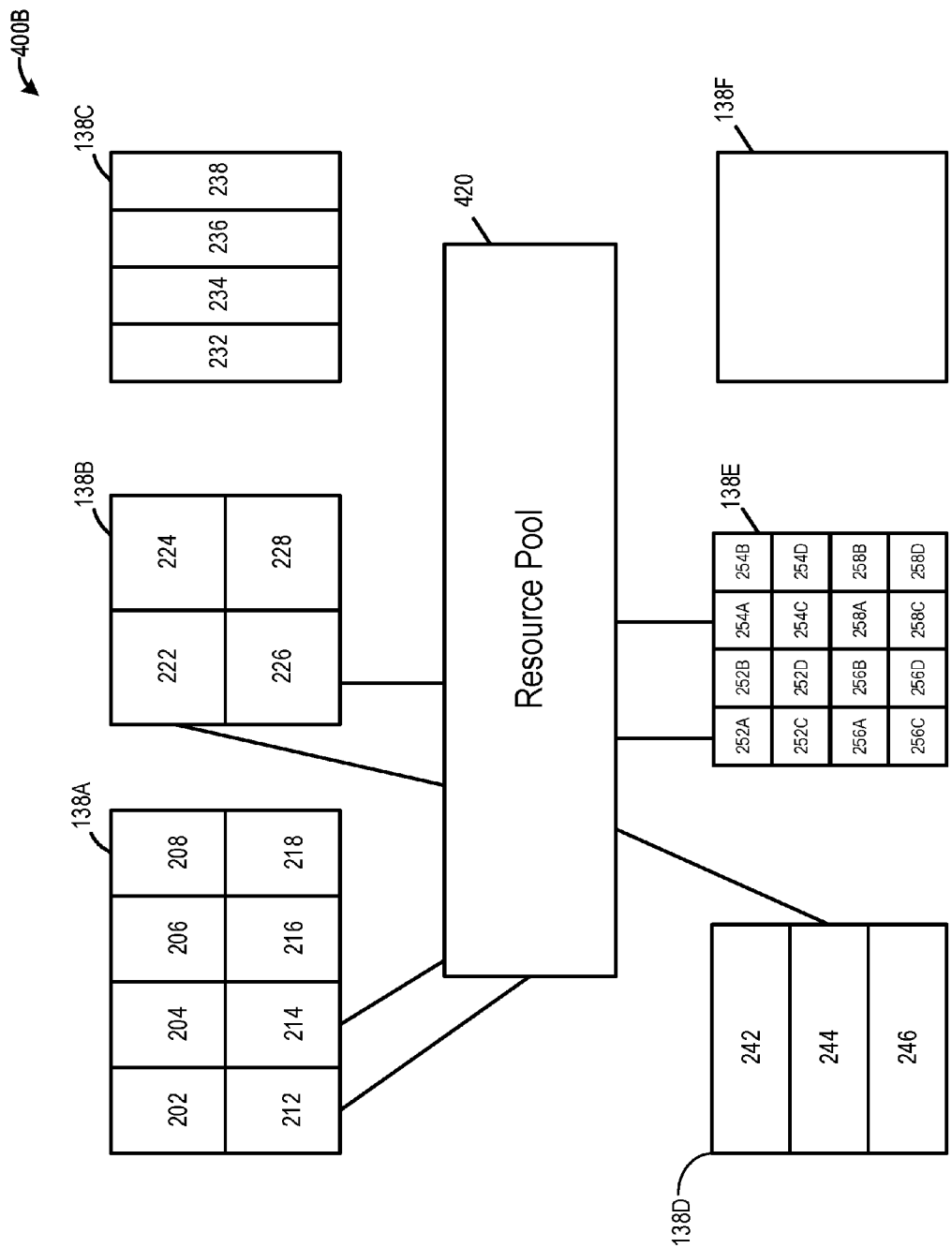
FIG. 4B is a block diagram illustrating a resource pool corresponding to an associated group of resources in accordance with another example embodiment.

Referring now to FIG. 4B, shown therein is another example of a resource pool 420. The associated group of resources defined by resource pool 420 includes two types (212, 214) of CPU resource kinds 138A, two types (222, 226) of GPU resource kinds 138B, a type 244 of software application 138D, and two types (252A and 254A) of storage devices 138E. The associated group of resources defined by resource pool 420 also excludes access to any sound processor resource kinds 138C and encryption module resource kinds 138F.

In FIGS. 4A and 4B, the associated group of resources defined by resource pool 410 includes a first token 252B of resource type 252 while the associated group of resources defined by resource pool includes a second token 252A of resource type 252. Thus, virtual computers assigned to either resource pool 410 or resource pool 420 have access to a resource of resource type 252. Similarly, resource pool 410 and resource pool 420 also both include a resource type 222 of the GPU resource kind.

In some embodiments, for a resource pool, at least two resources of a same type may be in the associated group of resources defined by the resource pool. In some embodiments, for a resource pool, the associated group of resource types for the resource pool include, for at least one resource kind in the associated group of resource kinds defined by the resource pool, a plurality of resource types defined for each of those particular kinds and exclude at least one of the resource types defined for each of those particular resource kinds.

Figure 4C:
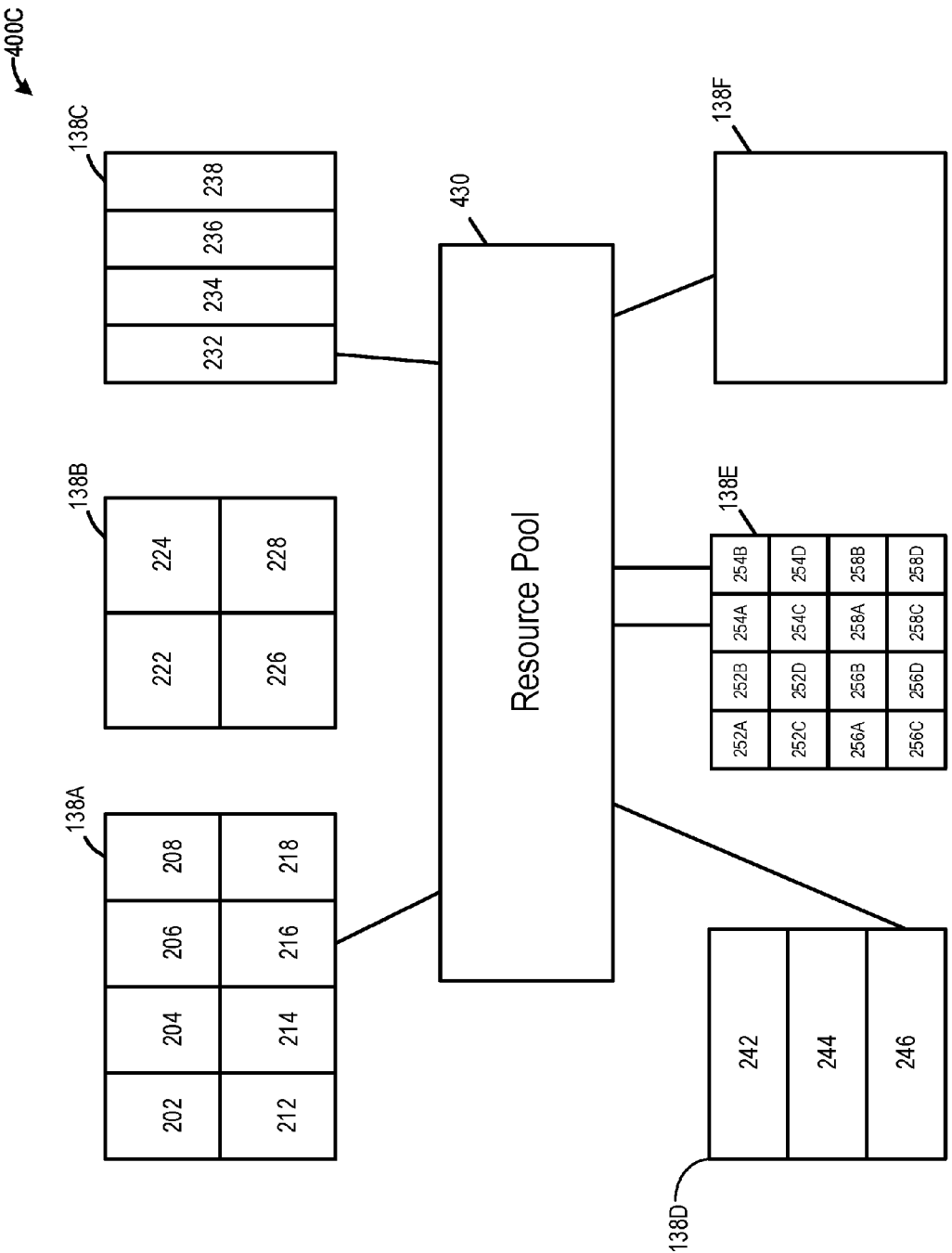
FIG. 4C is a block diagram illustrating a resource pool corresponding to an associated group of resources in accordance with a further example embodiment.

Referring now to FIG. 4C, shown therein is another example of a resource pool 430. Resource pool 430 defines an associated group of resources that includes CPU resource type 216, no GPU resource type, Sound processor resource type 232, software application type 246, storage device types 254A and 254B, and encryption module type 138F. As shown, resource pool 430 includes two tokens of storage devices 254 having read speed capabilities up to 200 MB/s.

In some embodiments, for a particular resource kind, the associated group of resources types defined by a resource pool may include at most one of the resource types defined for the particular resource kind. Referring again to FIG. 4C, in an example, the resource pool 430 may correspond, at least, to the resource kind, such as a software application, corresponding to the resource 138D. For example, the resource pool 430 may define an associated group of resources that includes at most one associated resource type of the Microsoft Office™ resource kind. In this example, the group of resources defined by resource pool 430 only has one resource type 246, such as Microsoft Office™ Student Edition, associated with the resource pool 430 at any given time. In such cases, it would not be possible, to have two different Microsoft Office™ resource types, such as Microsoft Office™ Student Edition and Microsoft Office™ Professional Edition, corresponding to a given resource pool 430 at a given time. Virtual computers requiring the increased functionality provided by the Microsoft Office™ Professional Edition type may require access to resource pools having that resource type.

In some cases, the host processing unit 132 may determine a plurality of resource usage profiles and define the plurality of resource pools based on the determined resource usage profiles. The host processing unit 132 may also use the resource usage profiles to assign the virtual computers to resource pools at 230 below. The host processing unit 132 may determine the resource usage profiles by determining, for each virtual computer in the plurality of virtual computers, an associated resource usage profile. The associated resource usage profile for a virtual computer may indicate, for each function in a group of functions associated with that virtual computer, a level of function required for that virtual computer. An example of defining the plurality of resource pools based on resource usage profiles will be described in greater detail below with reference to FIG. 6.

In some cases, the host processing unit 132 may also define a plurality of virtual computer clusters based on the resource usage profiles. The host processing unit 132 may then use the virtual computer clusters to define the plurality of resource pools and to assign virtual computers to resource pools. An example method for defining and monitoring virtual computer clusters will be discussed in greater detail below with reference to FIG. 9.

Referring again to FIG. 2, at 230, each virtual computer in the plurality of virtual computers can be assigned to an associated resource pool in the plurality of resource pools. The host processing unit 132 may assign each computer in the plurality of virtual computers to one of the resource pools defined at 220.

The host processing unit 132 may store the assignments of the virtual computers in the storage unit 136. To do so, the host processing unit 132 may define each resource pool element to also include at least one assigned virtual computer element. The assigned virtual computer elements for each resource pool element may identify the virtual computers assigned to the resource pool corresponding to that resource pool element.

At 240, once the virtual computers have been assigned to resource pools at 230, the host server can then automatically provide each virtual computer in the plurality of virtual computers with access to the associated group of resources corresponding to the associated resource pool to which that virtual computer was assigned and exclude access to all other resources in the plurality of resources to that virtual computer.

The host processing unit 132 may identify each assigned virtual computer element corresponding to a particular resource pool element. The host processing unit 132 can also identify the resource pool identifiers and corresponding access rights stored in that particular resource pool element. The host processing unit 132 may use the resource pool identifiers and access rights stored for that particular resource pool element to automatically provide access, for each virtual computer assigned to the resource pool corresponding to the particular resource pool element, to the associated group of resources for that resource pool.

At 250, for each resource pool, a pool usage profile can be determined by monitoring the usage of the resources in the associated group of resources corresponding to that resource pool by the virtual computers assigned to the resource pool. For example, the host processing unit 132 may monitor the usage of the resources in the associated group of resources corresponding to the resource pool.

In some embodiments, the host processing unit 132 may determine the pool usage profile for each resource pool by determining, for each resource kind in the associated group of resource kinds, a capacity of that resource kind.

For example, referring again to FIG. 4A, the host processing unit 132 may determine the pool usage profile for the resource pool 410 by determining the capacity of each resource kind in the associated group of resource kinds. That is, the host processing unit 132 may determine the pool usage profile by determining the capacity of the CPU resource kind 138A, the GPU resource kind 138B, the software resource kind 138D, and the storage device resource kind 138E. Similarly, the host processing unit 132 may also determine the capacity of each particular resource type in the resource pool.

In some examples, the host processing unit 132 may determine that the GPU corresponding to the resource 138B in the associated group of resources for the resource pool 410 may only provide 2D graphics acceleration processing functions for an image with a maximum resolution of 2560×1600 at a refresh rate of 60 Hz. That is, the host processing unit may determine that the GPU corresponding to the resource 138B may not render an image with a resolution greater than 2560×1600 at 60 Hz.

Generally, the capacity of a particular resource kind or resource type within a resource pool can refer to how much that resource kind can be operated by the virtual computers assigned to that resource pool. For example, where a resource pool has two tokens of a word processing software application resource kind, the capacity of the word processing software application resource kind for that resource pool is two. In other words, at most two virtual computers in that resource pool can concurrently access a word processing software application token.

For another example, the capacity of a CPU resource kind may refer to the ability of the CPU resource kind to concurrently perform the general operations required by the virtual computers in the resource pool. For example, where a particular CPU type is able to perform processing for multiple virtual computers in parallel the capacity of that CPU type may be limited by the number of operations the CPU is able to perform rather than the number of tokens of that particular CPU type.

The capacity of a particular resource kind may include multiple factors. For example, the capacity of a particular resource kind within a resource pool may also refer to the level of functionality available to a virtual computer accessing that resource pool. For example, where the resource pool includes, for a particular resource kind, two corresponding resource types and the resource pool includes five tokens of each resource type, then the capacity for that particular resource kind may include a number of virtual computers capable of accessing resources of that kind as well as a level of functionality accessible by those virtual computers. Alternatively, this may be determined by analyzing the capacity for each of the resource types corresponding to that particular resource kind.

For example, a particular resource pool may include a pdf software application resource kind. That particular resource pool may include two tokens of a first pdf resource type providing functionality for displaying pdf documents and two tokens of a second pdf resource type capable of displaying and modifying pdf documents. The capacity for the software application resource kind of that particular resource pool may be a combination of the number of tokens of that resource kind, and the functionality provided by the two different types for that particular resource kind. If the two tokens capable of modifying pdf documents are being accessed, capacity would be available for the pdf resource kind if the level of functionality required by a virtual computer is limited to displaying pdf documents. However, no capacity would be available for the pdf resource kind if the level of functionality required by a virtual computer includes modifying pdf documents.

The host processing unit 132 may also monitor a usage level of each resource kind. For example, the host processing unit 132 may monitor the usage level of the CPU corresponding to the resource 138A. If the associated group of resource types for a particular resource pool includes a CPU with multiple processing cores, the host processing unit 132 may determine that only one half of the number of processing cores of the CPU corresponding to the resource 138A are being used to provide computational functions. That is, the host processing unit 132 may determine, for example, that the usage level of the CPU, corresponding to the resource 138A, is 50%. The CPU may, at a given time, be functioning to provide computations and may additionally be able to provide at least double the number of computations currently undertaken.

As described, the host processing unit 132 may determine the resource pool usage profile for a resource pool by determining both the capacity of each resource kind in the associated group of resource kinds of the resource pool and also may monitor the usage level of each resource kind in the associated group of resource kinds of the resource pool. The combination of usage level and capacity level may indicate to the host processing unit 132 whether any particular resource kinds or resource types for a resource pool are overcapacity or undercapacity, and may provide data that can be used to redefine the resource pools and re-assign virtual computers.

Determining the pool usage profile for each resource pool may also include determining usage variability, for each resource kind (or resource type) in the associated group of resources for that pool. The usage variability for a resource kind (or type) may be determined by monitoring change in the usage level of that resource kind (or type). Usage variability may be used to determine whether a particular resource pool has resource usage with high variation or if there are times when the variability for a particular pool varies more than other times.

For example, the host processing unit 132 may determine that the usage level for a CPU resource 138A may vary from 20 percent usage of the CPU capacity to 90 percent usage of the CPU capacity and that the change or variability of the usage level is irregular. Accordingly, the host processing unit 132 may monitor the CPU resource usage level to ensure that the changes in CPU usage level do not result in a requested usage level greater than the CPU capacity.

In some embodiments, the host processing unit 132 may re-define resource pools or re-assign virtual computers to different resource pools based on the identified variability level. High variability in usage level of a given resource 138 in a resource pool may cause inefficient use of resources 138. For example, high variability in usage level of a given resource 138 may cause undercapacity conditions, where the amount of requested use for a resource kind is greater than what the resource kind is able to provide. As well, high variability can also result in overcapacity conditions for certain time periods when usage is low, or even when usage is only average as significant overcapacity is provided to meet the high variability in usage level. Accordingly, the host processing unit 132 may aim to redefine resource pools or reassign virtual computers to resource pools to minimize the occurrences of undercapacity and overcapacity conditions.

Referring again to FIG. 2, at 260, for each resource pool, the determined pool usage profile can be stored in a storage module accessible by the host server. The host processing unit 132 may store the determined pool usage profile in storage unit 136. The host processing unit 132 may store the pool usage profile for a particular resource pool in the resource pool element corresponding to that particular resource pool.

In some embodiments, changes in usage level may be cyclical or periodic. Referring again to FIG. 4A, the host processing unit 132 may determine a pool usage profile for the resource pool 410. The host processing unit 132 may determine changes in usage level for each of the resources kinds corresponding to the resources 138A, 138B, 138D, 138E. In an example, the host processing unit 132 may monitor and determine changes in usage level for a CPU corresponding to the resource 138A. The host processing unit 132 may determine that CPU usage level is near 90 percent of the CPU capacity starting at 9 o'clock until 11:30 o'clock in the morning, that the CPU usage level is approximately 40 percent of the CPU capacity from 11:30 in the morning to 4:30 in the afternoon, and that the CPU usage level is approximately 20 percent of the CPU capacity for all other times of the day. Accordingly, the host processing unit 132 may determine that for the CPU corresponding to the resource 138A in the associated group of resources for the resource pool 410, the usage level as a percentage of the CPU capacity changes at different times of the day.

In some embodiments, where changes in resource usage levels may be cyclical or periodic, the host processing unit 132 may define resource pools or may assign virtual computers to resource pools based on periodic changes in resource usage levels to maximize resource usage within defined resource pools.

Figure 5:
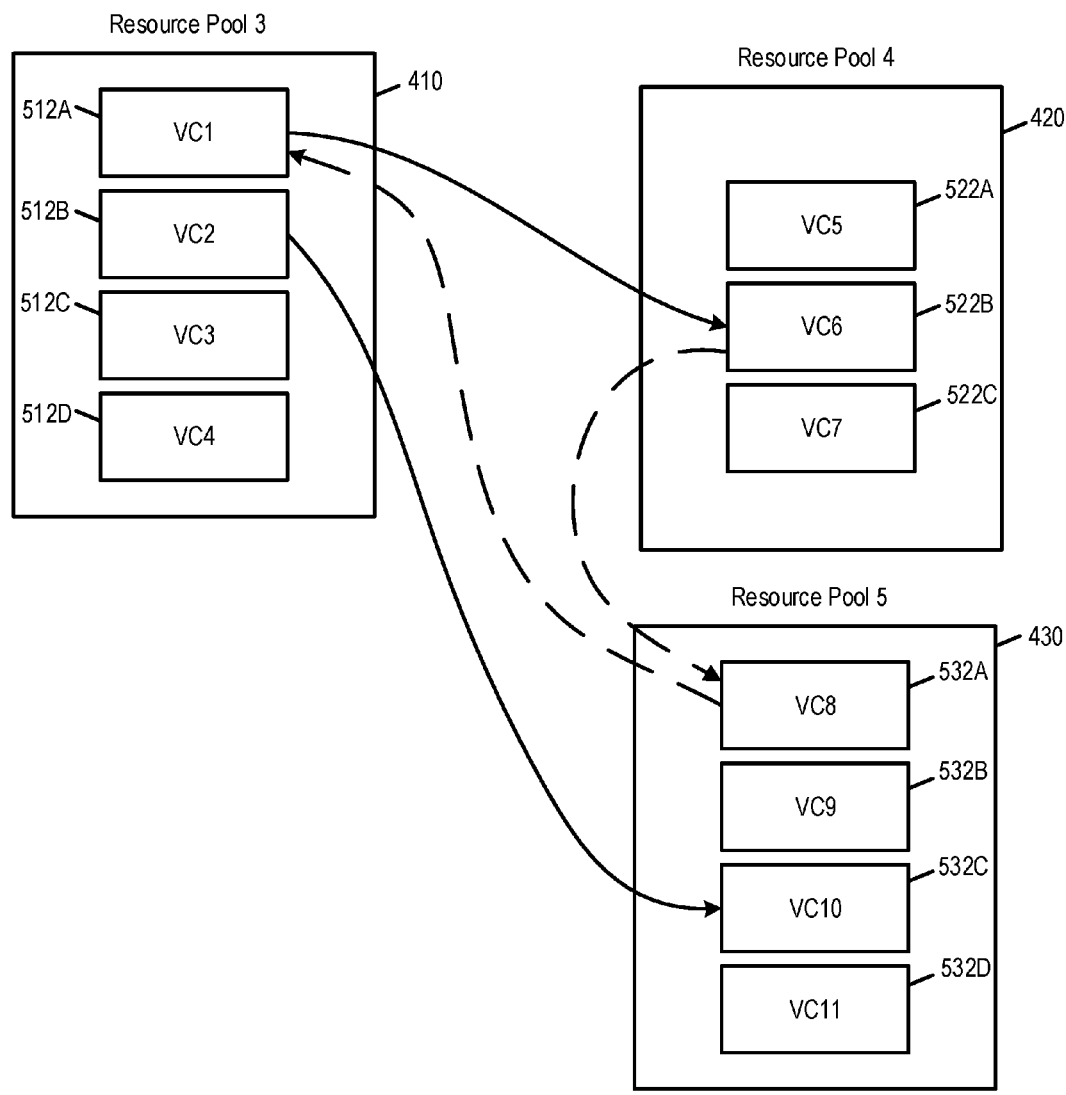
FIG. 5 is a block diagram illustrating the assignment of a plurality of virtual computers to a plurality of resource pools in accordance with an example embodiment.

Referring now to FIG. 5, shown therein is a block diagram 500 illustrating an example of a plurality of virtual computers assigned to a plurality of different resource pools in accordance with an example embodiment. As illustrated, a plurality of virtual computers 512A to 512D are assigned to resource pool 410. Similarly, virtual computers 522A to 522C are assigned to associated resource pool 420. Still further, virtual computers 532A to 532D are assigned to associated resource pool 430. In different embodiments, greater or fewer number of virtual computers may be assigned to any of the resource pools 410, 420, 430.

Once the virtual computers have been assigned to resource pools, the host processing unit 132 may automatically provide each of virtual computers 512A to 512D access to the associated group of resources corresponding to the resource pool 410. Referring again to FIG. 4A, the processing unit 132 may automatically provide each of virtual computers 512A to 512D access to the resource types of each resource kind associated with the group of resources defined by resource pool 410. That is, the processing unit 132 may automatically provide each of the virtual computers 512A to 512D access to CPU resource types 216 and 218, GPU resource type 222, software application resource type 242, and hard disk drive resource type tokens 252A. Further, in some embodiments the host processing unit 132 may exclude access to all other resource types and tokens that are not in the associated group of resources corresponding to the resource pool 410 from virtual computers 512A to 512D. Similarly, virtual computers 522A-522C can be automatically provided access to the associated group of resources defined by resource pool 420 and virtual computers 532A-532D can be automatically provided access to the associated group of resources defined by resource pool 430.

Figure 6:
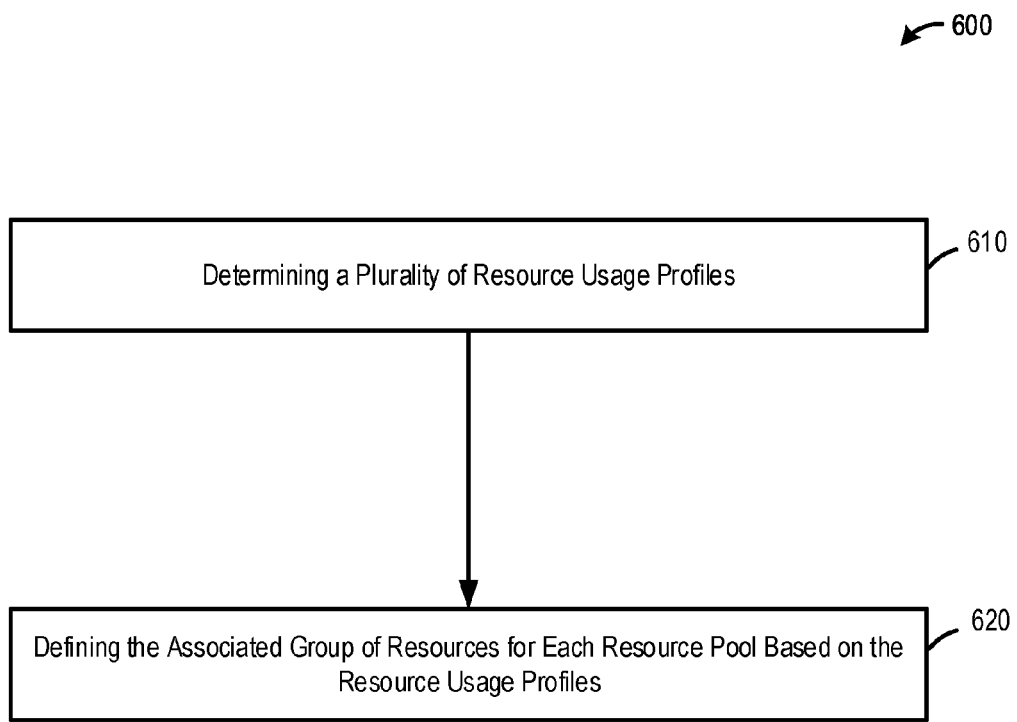
FIG. 6 is a flowchart of an example embodiment of a process for defining resource pool that may be used in embodiments of the method of managing resource allocation shown in FIG. 2.

Referring now to FIG. 6, shown therein is a flowchart of an example method 600 for defining a plurality of resource pools in accordance with an example embodiment.

At 610, a plurality of resource usage profiles can be determined by determining, for each virtual computer in the plurality of virtual computers, an associated resource usage profile. The associated resource usage profile for each virtual computer can be determined as a resource functionality requirement for that virtual computer. The resource functionality requirement may indicate, for each function in a group of functions associated with that virtual computer, a level of function required for that virtual computer.

In an example, the host processing unit 132 may determine a resource usage profile outlining a resource functionality requirement for a virtual computer being operated by a software programmer user. A software programmer may spend most of their time using low end resources for drafting software source code and troubleshooting software source code. At such times, when the software programmer user is accessing a virtual computer using a remote device 110, the software programmer may only require CPU resource kinds, random access memory resource kinds, very basic GPU resource kinds, and a minimal amount of storage on a hard disk drive.

When a software programmer has completed drafting software source code and is troubleshooting the software source code, the software programmer may subsequently compile the software source code and require different resource functionality requirements. When compiling the software source code, the software programmer may then require, for example, greater CPU resource kinds, greater access to random access memory resource kinds, greater amounts of storage on a hard disk drive, and no increase in the amount of GPU resource kinds. Accordingly, the host processing unit 132 may determine a resource usage profile for the software programmer user indicating situations when the software programmer is drafting and troubleshooting software source code and for when the software programmer is compiling software source code.

In another example, the host processing unit 132 may determine a resource usage profile outlining a resource functionality requirement for a radiologist for running a medical imaging system, such as a picture archiving and communication system ("PAC system"), for viewing medical reports, x-rays and interacting with a medical team. A radiologist may spend some time viewing three-dimensional images, such as magnetic resonant imaging (MRI) images, and for the remainder of the time when the radiologist is not viewing three-dimensional images, the radiologist may utilize the PAC system for archiving and communication functions.

When a radiologist may be using the PAC system for archiving and communication functions, the radiologist may require access to a virtual computer with some CPU resource kinds, random access memory (RAM) resource kinds, but no GPU resource kinds. However, when a radiologist may be using the PAC system to view and manipulate three dimensional images, the radiologist may require access to a virtual computer with a greater amount of CPU resource kinds, a greater amount of random access memory resource kinds, and GPU resource kinds. The exemplary increase in the resource kinds allows a radiologist to optimally view and manipulate three dimensional images.

At 620, the plurality of resource pools can be defined by defining an associated group of resources for each resource pool in the plurality of resource pools such that each virtual computer is allocatable to at least one of the resource pools with the at least one of the resource pools having an associated group of resources sufficient for the resource usage profile for that virtual computer.

Continuing with the example above relating to a software programmer, the host processing unit 132 may define the associated group of resource kinds for a first resource pool such that a software programmer may access a virtual computer with access to an associated group of resources defined by a resource pool for drafting and troubleshooting software source code. In an example, the host processing unit 132 may define a resource pool with an associated group of resources consisting of four CPUs of a first CPU resource type, 16 GB of random access memory, no GPUs, and a small capacity on a hard disk drive.

The host processing unit 132 may additionally define a separate resource pool with an associated group of resources consisting of eight CPUs of a second CPU resource type providing increasing computational capacity, no GPU resources, 32 GB of random access memory and a small capacity on a hard disk drive. That is, the second resource pool may define the associated group of resources for providing a virtual computer to a software programmer compiling software source code.

In the example given above relating to a radiologist, the host processing unit 132 may define a resource pool with an associated group of resources consisting of 2 CPU resources, 4 GB of random access memory and no GPU resources for when a radiologist is operating the PAC system and not viewing and manipulating three dimensional images.

The host processing unit 132 may also define a separate group of resources for another resource pool that can be accessed by a radiologist viewing and manipulating three dimensional images. This separate resource pool may include 4 CPU resources, 16 GB of random access memory and 2 GPU resources.

Although the above examples describe a host processing unit 132 as defining resource pools with specific quantities of resources necessary for the virtual computers, it will be understood that the host processing unit 132 may define resource pools with an associated group of resources containing greater quantity or capacity of resource kinds or types that may be sufficient to provide virtual computers with specific functionality. For example, the first resource pool defined for the software programmer could also be used to provide resources for a radiologist when operating the PAC system and not viewing and manipulating three dimensional images.

In some embodiments, the host processing unit 132 may monitor ongoing resource usage for each virtual computer in the plurality of virtual computers. Then, based on the monitoring of the resource usage for each virtual computer, the host processing unit 132 may identify at least one virtual computer in the plurality of virtual computers having an associated resource usage profile that has significantly changed. The at least one virtual computer having an associated resource usage profile that has significantly changed may be presently assigned to a first resource pool and the host processing unit 132 may determine that the associated resource usage profile for the at least one virtual computer may better correspond to a second resource pool in the plurality of resource pools. The at least one virtual computer can be transferred from the first resource pool to the second resource pool and the host server can automatically provide the at least one virtual computer with access to the associated group of resources of the second resource pool.

For example, where a radiologist is viewing and manipulating three dimensional images on a PAC system, the host processing unit 132 may identify that when the radiologist is viewing and manipulating recently captured three dimensional images of medical patient organs, the associated resource usage profile for the radiologist has significantly changed. That is, the recently captured three dimensional images may have been captured with a newer higher resolution camera and PAC system may require significantly greater CPU and GPU processing resources to allow a radiologist accessing a virtual computer to view and manipulate the newly captured three dimensional images.

Accordingly, the host processing unit 132 may identify a second resource pool that may better correspond to the associated resource usage profile of a radiologist viewing and manipulating three dimensional images captured with the newer high resolution cameras and subsequently transfer the virtual computer from the originally defined resource pool to the different resource pool having greater CPU and GPU processing resources. The host processing unit 132 may then automatically provide the virtual computer being accessed by the radiologist access to the associated group of resources of the second resource pool.

In some embodiments, the host processing unit 132 may assign at least two virtual computers having different resource usage profiles to a resource pool, where the resource pool defines an associated group of resources sufficient for the resource usage profiles of the at least two virtual computers to be satisfied concurrently. For example, the resource usage profiles of two virtual computers may indicate that when operated they require similar resource functionality, but that they are typically operated at non-overlapping time periods. Thus, both virtual computers may be assigned to a resource pool having resource capacity only sufficient to provide the functionality required by one of those virtual computers at a time, but still likely to satisfy the resource usage profiles because the time periods of usage do not usually overlap.

In some other embodiments, the host processing unit 132 may assign at least two virtual computers having different resource usage profiles to a resource pool to reduce overcapacity scenarios. That is, the host processing unit 132 may determine that a virtual computer with a first resource usage profile may utilize certain resources 138 very frequently but may only utilize certain a second group of resources 138 sporadically. In an effort to minimize overcapacity, the host processing unit 132 may assign a second virtual computer with a resource usage profile having functional requirements for utilizing the underutilized resource 138 of the first virtual computer. Accordingly, assigning at least two virtual computers having complementary resource utilization durations of time may assist in reducing scenarios of maintaining resources 138 in an overcapacity state.

Figure 7:
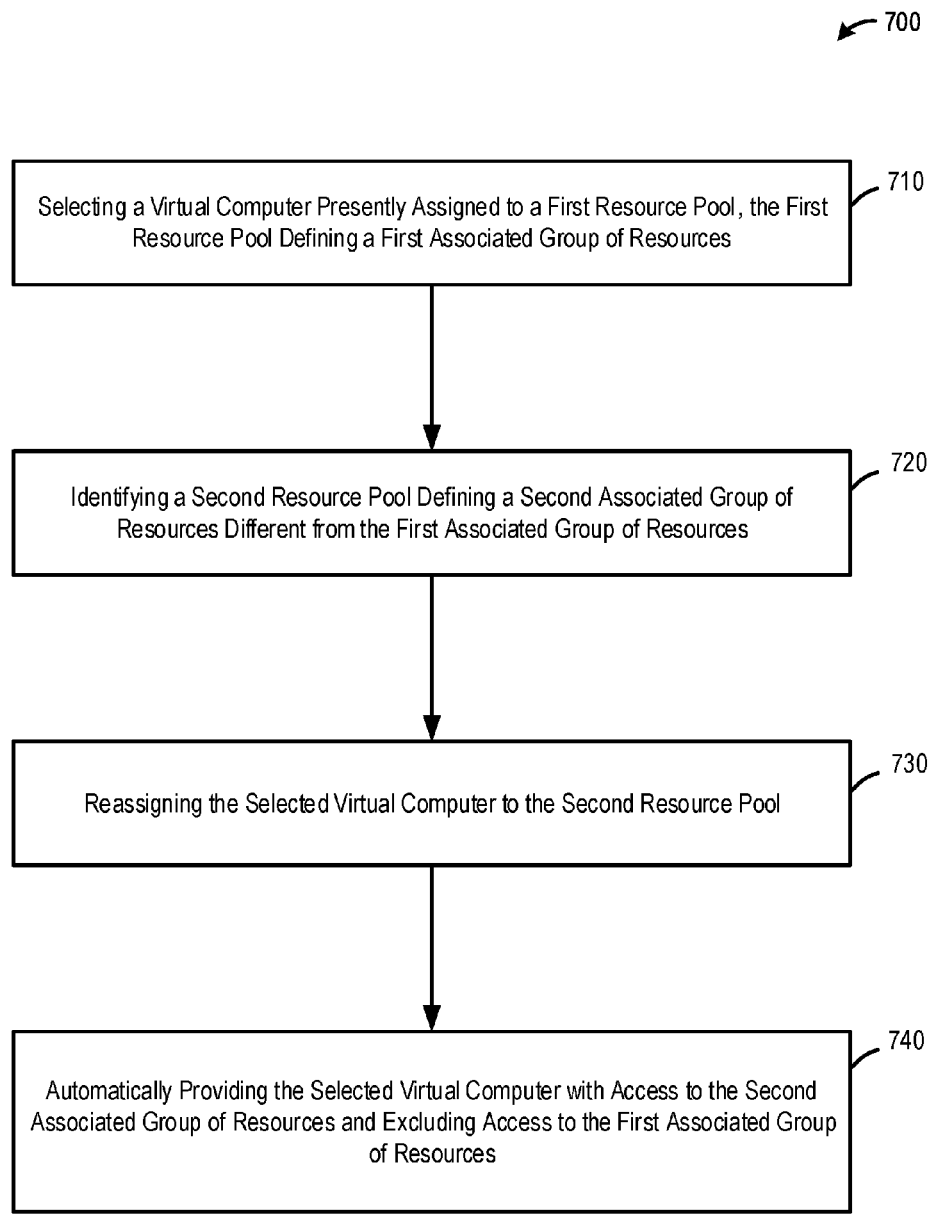
FIG. 7 is a flowchart of an example embodiment of a process for re-assigning a virtual computer to a second resource pool that may be used in embodiments of the method of managing resource allocation shown in FIG. 2.

Referring now to FIG. 7, shown therein is a flowchart of an example method 700 for reassigning a virtual computer to a second resource pool in accordance with an example embodiment. Simultaneous references may also be made to FIG. 5 to explain the steps of method 700.

At 710, the host processing unit 132 may select a virtual computer in the plurality of virtual computers. The selected virtual computer may be presently assigned to a first resource pool in the plurality of resource pools, where the first resource pool defines a first associated group of resources.

In some embodiments, a virtual computer can be selected based on receiving, at the host server, a request for modifying the resources to which the selected virtual computer has access. A user of a remote device 110 accessing a virtual computer may make a request for a greater, lesser or different quantity of resources for the virtual computer. In some cases, the request for a greater, lessor or different quantity of resources may be an explicit request from the user. For example, the host interface unit 134 may provide a user interface for a virtual desktop to a user of a remote device 110. The user of the remote device 110 accessing the virtual computer may graphically move a virtual computer, via an icon representing a virtual computer, from a graphical representation of one resource pool to a graphical representation of another resource pool. Alternatively, the user may indicate using the user interface the resources requested.

In some embodiments, a virtual computer is selected based on an implicit request for modifying the resources to which the selected virtual computer has access. For example, when a user of the virtual computer launches different applications having different resource functionality requirements, the virtual computer may be implicitly requesting modified resources to be provided to the virtual computer.

At 720, a second resource pool in the plurality of resource pools can be identified. The second resource pool may define a second associated group of resources different from the first associated group of resources.

In the previously described example relating to a software programmer, the host processing unit 132 may identify a second resource pool for providing resources to the virtual computer when the software programmer triggers a feature to compile software source code.

Referring briefly to FIG. 5, continuing with the example as previously discussed relating to a software programmer, the software programmer may be accessing a virtual computer, such as virtual computer 512B. Virtual computer 512B is initially assigned to resource pool 410 corresponding to an associated group of resources sufficient for providing a virtual desktop for drafting and troubleshooting software source code.

When the software programmer wishes to compile the software source code, the host processing unit 132 may identify a second resource pool, such as resource pool 430. The second associated group of resources corresponding to the second resource pool 430 may provide the resources 138 sufficient for compiling software source code.

The host processing unit 132 may identify the second resource pool by identifying resource functionality requirements of the selected virtual computer. For example, where the software programmer has triggered a feature to compile software source code, the host processing unit 132 may identify the resource functionality required to perform the compilation. The host processing unit 132 can then identify the second resource pool as a resource pool having an associated group of resources sufficient for the identified resource functionality requirements. The host processing unit 132 may identify the second resource pool by analyzing at least one of the resource pool elements in the storage unit 136 to identify a resource pool element indicating the associated group of resources sufficient for the identified resource functionality requirements.

At 730, the selected virtual computer can be reassigned to the second resource pool. As illustrated in FIG. 5, the host processing unit 132 may assign the virtual computer 512B to the second resource pool 430, where it is shown as virtual computer 532C. The host processing unit 132 may re-assign the selected virtual computer by removing the assigned virtual computer element corresponding to the selected virtual computer from the resource pool element corresponding to the first resource pool and store the assigned virtual computer element corresponding to the selected virtual computer in the resource pool element corresponding to the second resource pool.

At 740, the selected virtual computer can then be automatically provided with access to the second associated group of resources and excluded from access to the first associated group of resources. Once virtual computer 512B has been reassigned to the resource pool 430, the virtual computer may be identified as virtual computer 532C. The host processing unit 132 may automatically provide virtual computer 532C with access to the associated group of resources in resource pool 430. The host processing unit 132 may identify the resource pool identifiers and corresponding access rights stored in the second resource pool element. The host processing unit 132 can then use those resource pool identifiers and corresponding access rights to provide the selected virtual computer with access to the second associated group of resources. The host processing unit 132 may also exclude the selected virtual computer from accessing any resource not identified by the resource pool identifiers.

In another illustrative example, referring again to FIG. 5 and continuing with the example described above relating to a radiologist operating a PAC system, a radiologist operating a PAC system may be accessing a virtual computer 512A. The virtual computer 512A may be assigned to resource pool 410 defining an associated group of resources sufficient for providing the radiologist with a virtual computer with functionality not related to viewing and manipulating three dimensional images.

When the radiologist operates the virtual computer to subsequently view and manipulate three dimensional images, the host processing unit 132 may identify the virtual computer 512A being accessed by the radiologist and identify a second resource pool 420 defining an associated group of resources sufficient for providing the radiologist with a virtual computer with functionality required to view and manipulate three dimensional images.

The host processing unit 132 may reassign the virtual computer 512A to a second resource pool 420 and automatically provide the selected virtual computer, now shown as 522B, with access to the second associated group of resources. The host processing unit 132 may exclude access to the first associated group of resources in the first resource pool 410.

Further, continuing with the example as previously described, when the radiologist accessing the virtual computer 522B begins to view three dimensional images captured with a newer high resolution camera, the host processing unit 132 may subsequently determine that the resource pool 420 to which the virtual computer 522B is currently assigned may not have a sufficient associated group of resources for the required functionality.

Subsequently, the host processing unit 132 may reassign the virtual computer 522B to a third resource pool 430 that defines an associated group of resources for providing a virtual computer (now shown as 532A) to the radiologist for viewing the three dimensional images captured with a higher resolution camera.

Once the radiologist is no longer viewing three dimensional images, the host processing unit 132 may subsequently identify that the virtual computer 532A no longer requires the associated group of resources defined by resource pool 430. That is, when the virtual computer 532A is no longer being operated to view and manipulate three dimensional images, some of the resources in the associated group of resources for the resource pool 430 may be in an overcapacity state. Accordingly, the host processing unit 132 may reassign virtual computer 532A to the resource pool 410, where the resource pool 410 defines an associated group of resources sufficient to provide the basic functionality required by the radiologist user.

Figure 8:
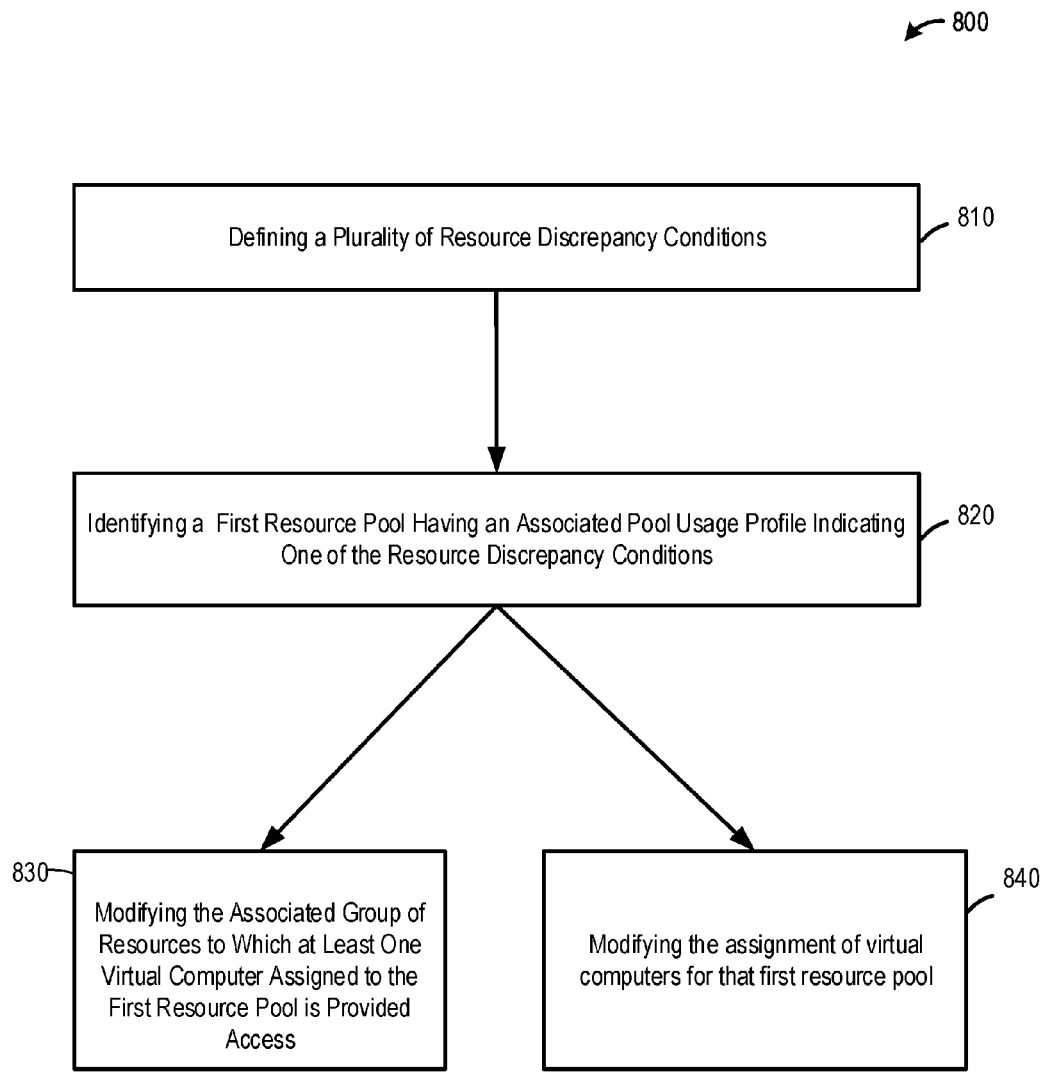
FIG. 8 is a flowchart of an example embodiment of a process for identifying resource discrepancies that may be used in embodiments of the method of managing resource allocation shown in FIG. 2.

Referring now to FIG. 8, shown therein is a flowchart of an example method 800 for identifying and overcoming resource discrepancy conditions in accordance with an example embodiment.

At 810, a plurality of resource discrepancy conditions can be defined. For example, the host processing unit 132 may define the resource discrepancy conditions or the resources discrepancy conditions may be initially defined by an administrator of the host server 130.

The plurality of resource discrepancy conditions may include an overcapacity condition where the usage level of at least one resource kind is less than the capacity of that resource kind by an overcapacity threshold. The overcapacity threshold may be set initially by an administrator of host server 130 to prevent overcapacity (i.e. underutilization) of resources. In some embodiments, the overcapacity condition may be associated with a duration of overcapacity time. That is, once the host processing unit 132 identifies overcapacity in a resource pool (i.e. the usage level of at least one resource kind is less than the capacity of that resource kind by an overcapacity threshold) the host processing unit 132 may identify the resource pool as having an overcapacity condition when the overcapacity occurs for a set duration.

For example, the overcapacity threshold for a particular resource kind (or type) may be 10%, such that if usage of that particular resource kind drops below 90% of capacity the overcapacity condition may be satisfied. In cases where the overcapacity condition is satisfied when the overcapacity occurs for a set duration, the duration for that particular resource could be an hour, for example. In such cases if usage of that particular resource kind drops below 90% of capacity and remains below 90% of capacity for an hour, the overcapacity condition may be satisfied. Alternatively, the set duration may be expressed as a percentage of overall usage time (e.g. 10%), such that if usage of that particular resource kind is below 90% of capacity 10% of the time, then the overcapacity condition may be satisfied. For example, the percentage of overall usage time could be determined based on a moving average of time spent at overcapacity, over a window such as a day or a month.

The resource discrepancy conditions may also include an undercapacity condition where a requested usage of at least one resource kind is greater than an undercapacity threshold of that resource kind. The undercapacity threshold for each resource kind can be determined based on the capacity and the usage variability of that resource kind.

For example, where a particular resource kind in a resource pool has a high usage level but low variability the undercapacity threshold may be set to allow usage to approach capacity. This may be done to minimize overcapacity and because the risk of requested usage approaching the absolute capacity level is low due to the low variability in usage of that resource kind. In contrast, where a particular resource kind has a high variability in usage, the undercapacity threshold may be met at a lower usage level to guard against the possibility of having too much requested usage.

The resource discrepancy conditions may also include a fluctuation condition where the usage variability of at least one resource kind is greater than a variability threshold. Generally, high variability in usage may be undesirable as it is likely to lead to periods of both overcapacity and undercapacity within the same resource pool. Accordingly, the resource pools may be re-defined or assignments of virtual computers may be adjusted to reduce the variability in usage. In some cases, time periods with particularly high variability rate may be identified (sometimes as recurring events), and adjustments can be made to account for such time periods.

For example, in a resource pool with 8 CPU cores the host processing unit 132 may define an undercapacity threshold to correspond to a request for operating CPU resources requiring greater than seven of the eight processing cores. In an example, if a virtual computer assigned to the resource pool is being operated by a user manipulating large sets of numerical data, the user request may require the equivalent of ten CPU processing cores. In such a case, the host processing unit 132 would identify an undercapacity condition.

As described, the undercapacity threshold for each resource kind may be determined based on the capacity and the usage variability of the resource kind. In an example, if the usage of the resource kind, such as a CPU, has low variability, the undercapacity threshold may be defined, for example, to be approximately the capacity of the resource kind, although in practice it will typically be at least slightly below the capacity of the resource kind, so that some warning is given before there is a shortfall in capacity.

For example, the undercapacity threshold for a resource kind having low variability may be set to 98% of capacity for that resource kind. When the requested usage for that resource kind is at or greater than 98% of capacity, then the undercapacity condition may be satisfied. In contrast, the undercapacity threshold for a resource kind having high variability may be set to 80% of capacity for that resource kind. When the requested usage for that resource kind is at or greater than 80% of capacity, then the undercapacity condition may be satisfied. Once again, a set duration may be used to identify an undercapacity condition in the same manner as the set duration for the overcapacity condition described above.

At 820, the host processing unit 132 may identify a first resource pool having an associated pool usage profile indicating one of the resource discrepancy conditions. The first resource pool can be identified based on the monitored usage of the plurality of resource pools stored in storage unit 136.

When the host processing unit 132 identifies a resource pool having an associated pool usage profile indicating one of the resource discrepancy conditions as described, the host processing unit 132 may modify the associated group of resources to which at least one virtual computer assigned to the first resource pool is provided access at 830 and/or modify the assignment of virtual computers for the first resource pool at 840. In some cases, the associated group of resources to which every virtual computer assigned to the first resource pool is provided access may be modified.

In some embodiments, the host processing unit 132 may modify the associated group of resources corresponding to the resource pool identified as having a resource discrepancy condition by reassigning at least one virtual computer to a second resource pool. The host server can then automatically provide the at least one virtual computer with access to the group of resources associated with the second resource pool and exclude access to the group of resources associated with the first resource pool. For example, this may occur where the host processing unit 132 determines that the at least one virtual computer has a resource usage profile indicating that it is contributing to the resource discrepancy condition in the first resource pool. In some cases, the at least one virtual computer may be replaced by another virtual computer whose resource usage profile is better suited to the first resource pool.

In some embodiments, the host processing unit 132 may modify the associated group of resources to which every virtual computer assigned to the first resource pool is provided access by reassigning every virtual computer from the first resource pool to a second resource pool. The host processing unit 132 may subsequently automatically provide every computer that is reassigned access to the group of resources associated with the second resource pool and block access to the group of resources associated with the first resource pool. For example, this may occur where the virtual computers previously assigned to the first resource pool have undergone a significant change in their resource usage profiles such that the associated group of resources defined by the first resource pool is no longer sufficient for their resource functionality requirements.

In some embodiments, the host processing unit 132 may modify the associated group of resources corresponding to the resource pool identified as having a resource discrepancy condition by redefining the associated group of resources of the resource pool to account for the resource discrepancy. For example, if a CPU resource kind is identified with an undercapacity condition, the host processing unit 132 may, add an additional token of that CPU resource kind to increase the capacity of that CPU resource kind. Alternatively, the host processing unit 132 may redefine the associated group of resources to replace the CPU resource type with a different CPU resource type having greater capacity.

In some embodiments, the host processing unit 132 may identify recurring changes to an associated pool usage profile of a first resource pool corresponding to a resource discrepancy condition. The host processing unit 132 may subsequently redefine the associated group of resources of the first resource pool such that the redefined associated group of resources prevents the occurrence of the resource discrepancy condition associated with the recurring changes in the associated pool usage profile.

For example, the host processing unit 132 may identify recurring changes in the associated pool usage profile of the first resource pool as an undercapacity condition of the CPU resource kind. That is, the host processing unit 132 may identify that every day between the hours of 9 am and 4 pm the CPU resource kind experiences an undercapacity condition. Accordingly, the host processing unit 132 may determine that the virtual computers assigned to the first resource pool require a usage level greater than the undercapacity threshold of the CPU resource. The CPU resource kind currently in the resource group associated with the first resource pool is insufficient to handle the requested level of processing operations requested by the plurality of virtual computers assigned to the first resource pool.

Accordingly, the host processing unit 132 may redefine the associated group of resources of the first resource pool such that the redefined associated group of resources prevents the occurrence of the undercapacity condition associated with the recurring changes in the associated pool usage profile. For example, the host processor unit 132 may add an additional CPU resource of the same resource type or replace the CPU resource with another CPU resource type to providing increased resource capacity and prevent the identified recurring undercapacity condition.

In some embodiments, the host processing unit 132 may identify that recurring changes to the associated pool usage profile for a resource pool are periodic. Accordingly, the host processing unit 132 may identify a period of the recurring changes to the associated pool usage profile and continually redefine the associated group of resources of the first resource pool prior to the changes occurring using the identified period.

For example, the host processing unit 132 may identify recurring changes to the associated pool usage profile of the first resource corresponding to an overcapacity condition relating to the GPU resource kind. The host processing unit 132 may identify that on every other day, the GPU resource kind experiences an overcapacity condition.

Consequently, based on the identified period, the host processing unit 132 may continually redefine the associated group of resources in the first resource pool prior to the changes. For example, the host processing unit 132 may redefine the associated group of resources for the first resource pool to include a first GPU resource type during the periods having overcapacity conditions. Similarly, the host processing unit 132 may redefine the associated group of resources for the first resource pool to include a second GPU resource type or a plurality of the first GPU resource type for time periods that do not result in overcapacity.

Figure 9:
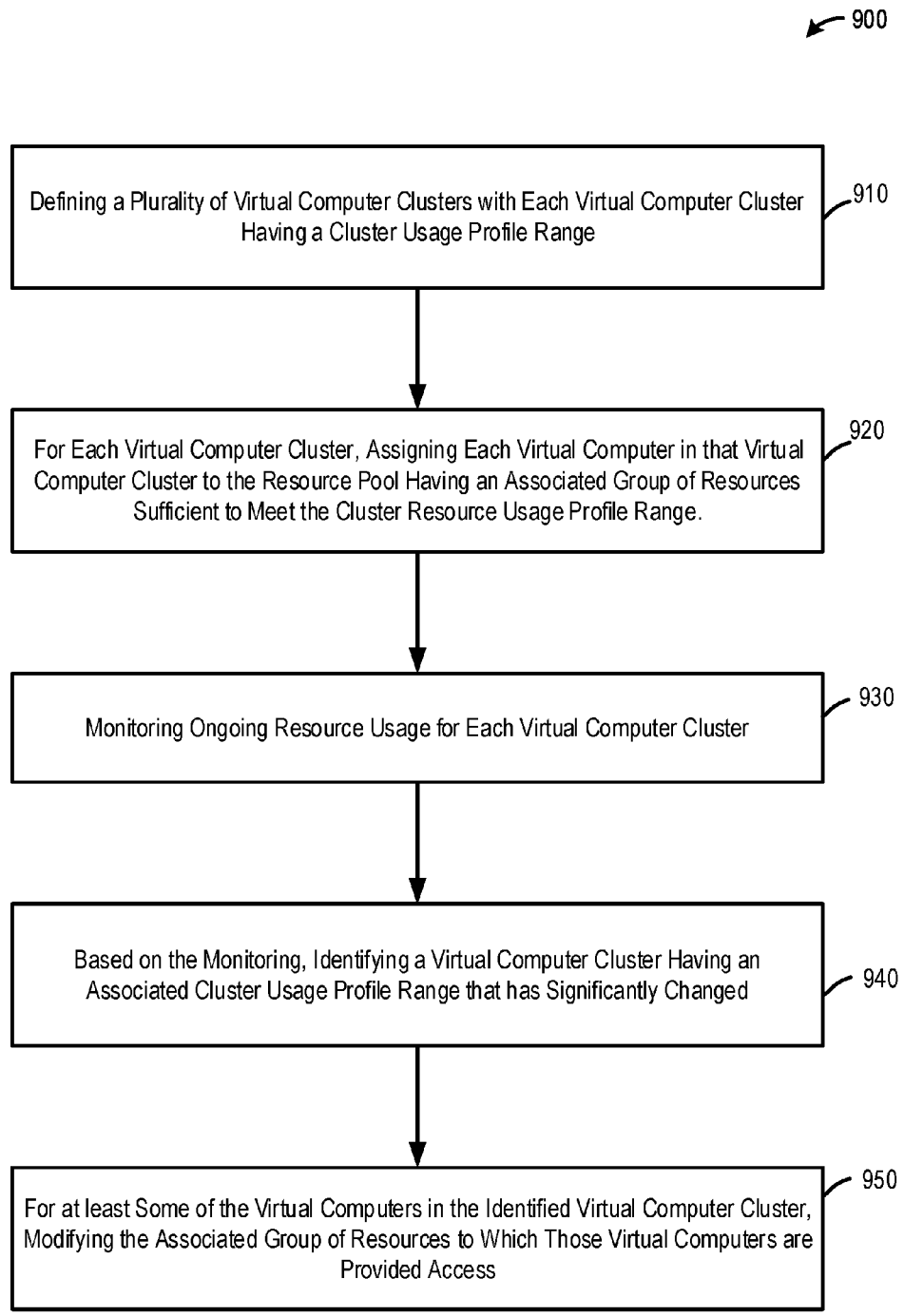
FIG. 9 is a flowchart of an example embodiment of a process for defining and monitoring virtual computer clusters that may be used in embodiments of the method of managing resource allocation shown in FIG. 2.

Referring now to FIG. 9, shown therein is a flowchart of a method 900 for defining and monitoring virtual computer clusters in accordance with an example embodiment.

At 910, a plurality of virtual computer clusters can be defined, each virtual computer cluster can include at least two virtual computers from the plurality of virtual computers, and each virtual computer cluster may have a cluster usage profile range that is determined based on the resource usage profiles for every virtual computer in that virtual computer cluster.

In some embodiments, the host processing unit 132 may define a virtual computer cluster comprising at least two virtual computers having similar functional requirements. The cluster usage profile range of a given virtual computer cluster can be defined to include a plurality of virtual computers having shared functional requirements. Because the functional requirements of each virtual computer in a virtual computer cluster may vary slightly, the cluster usage profile range accounts for variations in functional requirements.

The host processing unit 132 may use the cluster usage profile range to define a pool of resources based on the shared functional requirements and assign the virtual computers in the virtual computer cluster to that pool of resources. The host processing unit 132 may use virtual computer clusters to define resource pools to minimize overcapacity, undercapacity, and to reduce variability in usage.

Where a large number of virtual computers having similar functional requirements are identified, a pool of resources can be defined to include an associated group of resources that are sufficient for those functional requirements. Generally, the larger the cluster of virtual computers (all having resource usage profiles within a small cluster usage profile range), the less likely there is to be variability in usage. This is merely the result of the law of large numbers theorem that suggests that the greater the number of trials, the more likely the results will be close to the expected value. In the context of resource usage, this implies that for a large cluster of virtual computers having similar resource usage profiles (based on monitoring of past usage) the likelihood of a significant change in usage by the cluster as a whole is less as the cluster increases in size.

Thus, the host processing unit 132 may identify large clusters and define resource pools with sufficient resources to satisfy those large clusters, while maintaining a small overcapacity threshold (due to the minimized variability expected from the large cluster).

At 920, each virtual computer in the plurality of virtual computers can be assigned to an associated resource pool by, for each virtual computer cluster, assigning each virtual computer in that virtual computer cluster to the resource pool having an associated group of resources sufficient to meet the cluster resource usage profile range.

Referring again to FIG. 5, in an example, several virtual computers are illustrated that may associated with a virtual computer cluster. For example, virtual computers 512A to 512D are assigned to the resource pool 410, where the resource pool 410 defines an associated group of resources sufficient to meet the resource usage profile of each of the virtual computers 512A to 512D. That is, based on the resource usage profile of each of the virtual computers 512A to 512D, the host processing unit 132 may determine a cluster resource usage profile range for a virtual computer cluster comprising the virtual computers 512A to 512D. Subsequently, the host processing unit 132 may define an associated group of resources sufficient to meet the resource usage profile for each virtual computer 512A to 512D, or equivalently to meet the cluster resource usage profile range.

In other embodiments, for at least two virtual computers in a same virtual computer cluster, a first virtual computer of that same virtual computer cluster is assigned to a first resource pool and a second virtual computer of that same virtual computer cluster is assigned to a second resource pool. Although virtual computers within a virtual computer cluster may have the same functional limitation requirements, the host processing unit 132 may assign virtual computers associated with the same virtual computer cluster to different resource pools where it may be advantageous for reducing overcapacity of one or more resources.

In some cases, the host processing unit 132 may assign virtual computers from different virtual computer clusters to the same resource pool. This may occur where two different virtual computer clusters are identified having cluster profile ranges that complement one another. For example, where two virtual computer clusters have similar resource functionality requirements, but the time of use for the two clusters does not overlap, or minimally overlaps, the two clusters may be assigned to a single resource pool sufficient to satisfy their resource functionality requirements. Alternatively, two virtual computer clusters may require similar functionalities, but may require different levels of those functionalities. With respect to either one of the virtual computer clusters it may be difficult to define a resource pool that provides sufficient capacity with respect to some of those functionalities without providing significant overcapacity of others of the required functionalities. If the second virtual cluster requires significantly more functionality from the kinds of resources that provided the significant overcapacity to the first virtual cluster, then it may be advantageous to combine these virtual clusters in the same pool of resources. Of course, these advantages will be magnified if the converse situation also holds, that the first virtual cluster also requires significantly more functionality from the kinds of resources that provide a significant overcapacity to the first virtual cluster.

At 930, ongoing resource usage for each virtual computer cluster in the plurality of virtual computer clusters can be monitored.

In some embodiments, the host processing unit 132 may monitor a capacity level and usage level of each resource kind or resource type in the associated group of resources corresponding to the resource pool for each virtual computer in the virtual computer cluster on an ongoing basis. The host processing unit 132 may also monitor the usage variability level of each resource in the associated group of resources corresponding to the resource pool for each virtual computer in the virtual computer cluster.

At 940, based on the monitoring, a virtual computer cluster in the plurality of virtual computer clusters having an associated cluster usage profile range that has significantly changed can be identified.

The host processing unit 132 may determine that an associated cluster usage profile range for a virtual computer cluster has changed and that the associated group of resources assigned to the virtual computers in the virtual computer cluster may no longer be sufficient for the cluster usage profile range.

For example, where the virtual computer cluster corresponds to virtual computers operate by users in an accounting department, the cluster usage profile range may change significantly at times when a high level of billing is done, such as the end of the month or end of the year. Thus, during these high billing cycles, the virtual computer cluster may require different (e.g. increased) resource functionality.

At 950, for at least some of the virtual computers in the identified virtual computer cluster, the associated group of resources to which those virtual computers are provided access can be modified.

In some embodiments, the host processing unit 132 may reassign at least some of the virtual computers in the identified virtual computer cluster to another resource pool. For example, at least some of the virtual computers may require access to additional CPU resources, and may be assigned to another resource pool with the ability to provide access to additional CPU resources.

In some embodiments, the host processing unit 132 may modify the associated group of resources corresponding to the resource pool for the virtual computer cluster. For example, the host processing unit 132 may re-define the associated group of resources to add additional CPU resources or change the type of CPU resources to provide additional functionality.

In some embodiments, the host processing unit 132 may determine that the cluster usage profile range may have changed significantly and may reassign every virtual computer in the virtual computer cluster from an existing resource pool to another resource pool, where the another resource pool may have an associated group of resources sufficient for the significantly changed cluster usage profile range.

In some embodiments, based on monitoring of each virtual computer cluster in the plurality of virtual computer clusters, the host processing unit 132 may redefine the plurality of virtual computer clusters such that at least one of the virtual computers in an identified virtual computer cluster is associated with a different virtual computer cluster after the plurality of virtual computer clusters are redefined. This may occur, for example where the virtual computers currently forming part of one virtual computer cluster are separating into two or more cluster sub-section. In such cases, different virtual computer clusters may be defined for those cluster sub-section to provide resource pools more directly suited to the users operating the virtual computers in those cluster sub-sections.

Various embodiments have been described herein by way of example only. Various modifications and variations may be made to these example embodiments without departing from the spirit and scope of the invention, which is limited only by the appended claims.

The invention claimed is:

1. A method of managing online resource allocation between a plurality of virtual computers, the method comprising:
   providing a plurality of resources via a host server, the plurality of resources being accessible to the plurality of virtual computers, wherein each virtual computer in the plurality of virtual computers is linked to electronically communicate with the host server;
   defining a plurality of resource pools for the host server, wherein each resource pool in the plurality of resource pools defines an associated group of resources selected from the plurality of resources and excludes other resources in the plurality of resources;
   assigning each virtual computer in the plurality of virtual computers to an associated resource pool in the plurality of resource pools; then
   for each virtual computer in the plurality of virtual computers, automatically providing, by the host server, that virtual computer with access to the associated group of resources corresponding to the associated resource pool to which that virtual computer was assigned and excluding access to all other resources in the plurality of resources to that virtual computer, wherein excluding access to all other resources in the plurality of resources comprises excluding access by that virtual computer to all other resources in all other resource pools in the plurality of resource pools; and
   for each resource pool:
      determining, by the host server, a pool usage profile by monitoring the usage, by the virtual computers assigned to that resource pool, of the resources in the associated group of resources corresponding to that resource pool; and
   storing the determined pool usage profile in a storage module accessible by the host server.

2. The method as defined in claim 1, further comprising:
   defining a plurality of resource kinds for providing a plurality of different functions, each resource kind in the plurality of resource kinds providing an associated function in the plurality of different functions, wherein each resource in the plurality of resources corresponds to a resource kind within the plurality of resource kinds and provides the associated function for that resource kind; and,
   wherein the associated group of resources for each resource pool corresponds to an associated group of resource kinds selected from the plurality of resource kinds, the associated group of resource kinds for each resource pool being different from an associated groups of resource kinds defined by at least one other resource pool in the plurality of resource pools.

3. The method as defined in claim 2, wherein for each resource pool, determining the pool usage profile comprises:
   determining, by the host server, for each resource kind in the associated group of resource kinds a capacity of that resource kind; and
   monitoring a usage level of each resource kind.

4. The method as defined in claim 3, further comprising, for each resource pool:
   determining, for each resource kind in the associated group of resource, a usage variability by monitoring change in the usage level of that resource kind.

5. The method as defined in claim 2, further comprising:
   defining, for each resource kind in the plurality of resource kinds, at least one resource type, each resource type corresponding to a particular resource kind and providing a different function level of the associated function provided by that resource kind, wherein each resource in the plurality of resources corresponds to a resource type; and wherein the associated group of resources for each resource pool is defined as an associated group of resource types, the associated group of resources types for a particular resource pool being defined by selecting, for each resource kind in the associated group of resource kinds defined for that pool, at least one of the resource types defined for that particular resource kind and excluding at least one of the resource types defined for that particular resource kind.

6. The method as defined in claim 1, further comprising:
selecting, by the host server, a selected virtual computer in the plurality of virtual computers, the selected virtual computer being presently assigned to a first resource pool in the plurality of resource pools, the first resource pool defining a first associated group of resources;
identifying a second resource pool in the plurality of resource pools, the second resource pool defining a second associated group of resources different from the first associated group of resources;
reassigning the selected virtual computer to the second resource pool; and then
automatically providing, by the host server, the selected virtual computer with access to the second associated group of resources and excluding access to the first associated group of resources.

7. The method as defined in claim 6, wherein the second resource pool is identified by:
identifying resource functionality requirements of the selected virtual computer; and
identifying the second resource pool as a resource pool having an associated group of resources sufficient for the identified resource functionality requirements.

8. The method as defined in claim 4, further comprising:
defining a plurality of resource discrepancy conditions, the plurality of resource discrepancy conditions comprising:
an overcapacity condition wherein the usage level of at least one resource kind is less than the capacity of that resource kind by an overcapacity threshold;
an undercapacity condition wherein a requested usage of at least one resource kind is greater than an undercapacity threshold of that resource kind, the undercapacity threshold for each resource kind being determined based on the capacity and the usage variability of that resource kind; and
a fluctuation condition wherein the usage variability of at least one resource kind is greater than a variability threshold;
identifying a first resource pool having an associated pool usage profile indicating one of the resource discrepancy conditions; and
at least one of:
modifying the associated group of resources to which at least one virtual computer assigned to the first resource pool is provided access; and
modifying the assignment of virtual computers for that first resource pool.

9. The method as defined in claim 8, wherein the associated group of resources to which at least one virtual computer assigned to the first resource pool is provided access is modified by:
re-assigning the at least one virtual computer to a second resource pool; and automatically providing, by the host server, the at least one virtual computer with access to the group of resources associated with the second resource pool and excluding access to the group of resources associated with the first resource pool.

10. The method as defined in claim 8, wherein the associated group of resources to which at least one virtual computer assigned to the first resource pool is provided access is modified by modifying the associated group of resources to which every virtual computer assigned to the first resource pool is provided access.

11. The method as defined in claim 10, wherein the modification is performed by:
re-assigning every virtual computer from the first resource pool to a second resource pool; and
automatically providing, by the host server, for every virtual computer being re-assigned, access to the group of resources associated with the second resource pool and excluding access to the group of resources associated with the first resource pool.

12. The method as defined in claim 10, wherein the modification is performed by:
redefining the associated group of resources of the first resource pool to account for the resource discrepancy.

13. The method as defined in claim 12, further comprising:
identifying recurring changes in the associated pool usage profile of the first resource pool associated corresponding to the resource discrepancy condition; and then
redefining the associated group of resources of the first resource pool such that the redefined associated group of resources prevents the occurrence of the resource discrepancy condition associated with the recurring changes in the associated pool usage profile.

14. The method as defined in claim 13, wherein when the recurring changes are periodic, the method further comprises:
identifying a period of the recurring changes to the associated pool usage profile; and then
continually redefining the associated group of resources of the first resource pool prior to the changes occurring using the identified period.

15. The method as defined in claim 1, wherein defining the plurality of resource pools comprises:
determining a plurality of resource usage profiles by determining, for each virtual computer in the plurality of virtual computers, an associated resource usage profile, the associated resource usage profile indicating, for each function in a group of functions associated with that virtual computer, a level of function required for that virtual computer; and
defining the associated group of resources for each resource pool in the plurality of resource pools such that each virtual computer is allocatable to at least one of the resource pools with the at least one of the resource pools having an associated group of resources sufficient for the resource usage profile for that virtual computer.

16. The method as defined in claim 15 further comprising:
monitoring ongoing resource usage for each virtual computer in the plurality of virtual computers; and then
based on the monitoring, identifying at least one virtual computer in the plurality of virtual computers having an associated resource usage profile that has significantly changed, the at least one virtual computer being presently assigned to a first resource pool in the plurality of resource pools, and the associated resource usage profile better corresponding to a second resource pool in the plurality of resource pools; and then transferring the at least one virtual computer from the first resource pool to the second resource pool; and automatically providing the at least one virtual computer with access to the associated group of resources of the second resource pool.

17. The method as defined in claim 15, further comprising:

defining a plurality of virtual computer clusters, each virtual computer cluster comprising at least two virtual computers from the plurality of virtual computers, each virtual computer cluster having a cluster usage profile range determined based on the resource usage profiles for every virtual computer in that virtual computer cluster; and assigning each virtual computer in the plurality of virtual computers to an associated resource pool by, for each virtual computer cluster:

assigning each virtual computer in that virtual computer cluster to the resource pool having an associated group of resources sufficient to meet the cluster usage profile range.

18. The method as defined in claim 17, further comprising:

monitoring ongoing resource usage for each virtual computer cluster in the plurality of virtual computer clusters; and then based on the monitoring, identifying a virtual computer cluster in the plurality of virtual computer clusters having an associated cluster usage profile range that has significantly changed; and then for at least some of the virtual computers in the identified virtual computer cluster, modifying the associated group of resources to which those virtual computers are provided access.

19. A system for managing online resource allocation between a plurality of virtual computers, the system comprising:

a storage module;

a host server, in operation the host server electronically communicating with the plurality of virtual computers and the storage module, and controlling access to a plurality of resources accessible to the plurality of virtual computers by:

defining a plurality of resource pools, wherein each resource pool in the plurality of resource pools defines an associated group of resources selected from the plurality of resources and excludes other resources in the plurality of resources;

assigning each virtual computer in the plurality of virtual computers to an associated resource pool in the plurality of resource pools; and then for each virtual computer in the plurality of virtual computers, automatically providing that virtual computer with access to the associated group of resources corresponding to the associated resource pool to which that virtual computer was assigned and excluding access to all other resources in the plurality of resources to that virtual computer, wherein excluding access to all other resources in the plurality of resources comprises excluding access by that virtual computer to all other resources in all other resource pools in the plurality of resource pools;

the host server further:

determining a pool usage profile by monitoring the usage, by the virtual computers assigned to that resource pool, of the resources in the associated group of resources corresponding to that resource pool; and storing the determined pool usage profile in the at least one storage module; and at least one remote processing device, in operation each remote processing device:

accessing at least one of the virtual computers to operate the associated group of resources corresponding to the associated resource pool to which that virtual computer was assigned.

* * * * *